(12) United States Patent
Liu et al.

(10) Patent No.: US 11,252,755 B2
(45) Date of Patent: Feb. 15, 2022

(54) UPLINK RESOURCE GRANT METHODS AND APPARATUS

(71) Applicant: Huawei Technologies Co., Ltd., Shenzhen (CN)

(72) Inventors: Zhe Liu, Shanghai (CN); Chaobin Yang, Shanghai (CN); Yong Wang, Shanghai (CN); Quanzhong Gao, Shanghai (CN); Hao Tang, Shanghai (CN); Fan Wang, Berkshire (GB); Guohua Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 16/713,588

(22) Filed: Dec. 13, 2019

(65) Prior Publication Data

US 2020/0120708 A1 Apr. 16, 2020

Related U.S. Application Data

(63) Continuation of application No. PCT/CN2018/091572, filed on Jun. 15, 2018.

(30) Foreign Application Priority Data

Jun. 16, 2017 (CN) .......................... 201710459797.5

(51) Int. Cl.
*H04W 72/14* (2009.01)
*H04W 72/04* (2009.01)
(Continued)

(52) U.S. Cl.
CPC ........... *H04W 72/14* (2013.01); *H04L 1/0038* (2013.01); *H04L 1/0045* (2013.01);
(Continued)

(58) Field of Classification Search
CPC ............... H04W 72/14; H04W 72/042; H04W 72/0453; H04W 72/0493; H04W 72/1268;
(Continued)

(56) References Cited

U.S. PATENT DOCUMENTS 9,042,840 B2 5/2015 Khandekar et al.
9,775,167 B2 9/2017 Horiuchi et al.
(Continued)

FOREIGN PATENT DOCUMENTS

CN 102083229 A 6/2011
CN 102347919 A 2/2012
(Continued)

OTHER PUBLICATIONS

"Final Report of 3GPP TSG RAN WG1 #89 v1.0.0 (Hangzhou, China, May 15-19, 2017)," Source: MCC Support, Document for: Approval, 3GPP TSG RAN WG1 Meeting #90, R1-1712031, Prague, Czech Rep, Aug. 21-25, 2017, 165 pages.
(Continued)

*Primary Examiner* — Omar J Ghowrwal
(74) *Attorney, Agent, or Firm* — Slater Matsil, LLP

(57) ABSTRACT

An uplink resource grant method includes receiving, by a terminal, configuration information from a network device, where the configuration information includes information about a first uplink resource and information about a second uplink resource, and searching, by the terminal, a search space for a downlink control channel to obtain grant information. The search space includes a first control channel candidate set when the downlink control channel carries grant information of the first (or the second) uplink resource, and the search space includes a second control channel candidate set when the downlink control channel carries grant information of the second (or the first) uplink resource or grant information of a downlink resource. The first
(Continued)

control channel candidate set is the same as the second control channel candidate set.

24 Claims, 11 Drawing Sheets

(51) Int. Cl.
| | | |
|---|---|---|
| *H04W 72/12* | (2009.01) | |
| *H04L 5/00* | (2006.01) | |
| *H04L 1/00* | (2006.01) | |
| *H04L 27/26* | (2006.01) | |

(52) U.S. Cl.
CPC .......... *H04L 1/0072* (2013.01); *H04L 5/0053* (2013.01); *H04L 5/0096* (2013.01); *H04L 5/0098* (2013.01); *H04W 72/042* (2013.01); *H04W 72/0453* (2013.01); *H04W 72/0493* (2013.01); *H04W 72/1268* (2013.01); *H04L 5/0005* (2013.01)

(58) Field of Classification Search
CPC . H04L 27/2601; H04L 5/0096; H04L 5/0053; H04L 5/0005; H04L 1/0072; H04L 1/0045; H04L 1/0038; H04L 5/0098
See application file for complete search history.

(56) References Cited

U.S. PATENT DOCUMENTS

| | | | |
|---|---|---|---|
| 10,615,939 B2 | 4/2020 | Ahn et al. | |
| 2012/0076088 A1 | 3/2012 | Hwang et al. | |
| 2012/0257552 A1 | 10/2012 | Chen et al. | |
| 2013/0010709 A1* | 1/2013 | Earnshaw | H04W 72/0453 370/329 |
| 2013/0034073 A1* | 2/2013 | Aiba | H04L 1/1887 370/329 |
| 2014/0098774 A1 | 4/2014 | Gao et al. | |
| 2016/0127106 A1* | 5/2016 | Nogami | H04L 5/0053 370/329 |
| 2016/0338052 A1 | 11/2016 | Ji et al. | |
| 2019/0222396 A1* | 7/2019 | Ahn | H04W 72/0446 |
| 2019/0223204 A1* | 7/2019 | Kim | H04B 1/00 |

FOREIGN PATENT DOCUMENTS

| | | |
|---|---|---|
| CN | 103563284 A | 2/2014 |
| CN | 103609186 A | 2/2014 |
| CN | 103888233 A | 6/2014 |
| JP | 2013509844 A | 3/2013 |
| JP | 2014508468 A | 4/2014 |
| JP | 2017108411 A | 6/2017 |
| RU | 2581614 C2 | 4/2016 |
| WO | 2010126418 A1 | 11/2010 |
| WO | 2013165206 A1 | 11/2013 |
| WO | WO-2015113293 A1 * | 8/2015 ........ H04W 72/0426 |
| WO | 2016108657 A1 | 7/2016 |

OTHER PUBLICATIONS

"UL Scheduling for Rel-14 eLAA," Source: CATT, Agenda Item: 7.3.1.1, Document for: Discussion and Decision, 3GPP TSG RAN WG1 Meeting #84bis, R1-162260, Apr. 11-15, 2016, 4 pages.
"3rd Generation Partnership Project; Technical Specification Group Radio Access Network; NR; Multiplexing and channel coding (Release 15)," 3GPP TS 38.212 V0.0.0, May 2017, 10 pages.
"3rd Generation Partnership Project; Technical Specification Group Radio Access Network; NR; NR and NG-RAN Overall Description; Stage 2 (Release 15)," 3GPP TS 38.300 V0.4.1, Jun. 2017, 55 pages.
"3rd Generation Partnership Project; Technical Specification Group Radio Access Network; NR; Medium Access Control (MAC) protocol specification (Release 15)," 3GPP TS 38.321 V0.0.3 , May 2017, 20 pages.
"3rd Generation Partnership Project; Technical Specification Group Radio Access Network; NR; Radio Resource Control (RRC); Protocol specification (Release 15)," 3GPP TS 38.331 V0.0.3, May 2017, 20 pages.
"Discussion on PDCCH False Alarm Issue for eCA," Source: Panasonic, Agenda Item: 7.2.2.2, Document for: Discussion and Decision, 3GPP TSG RAN WG1 Meeting #82, R1-153974, XP051039372, Aug. 24-28, 2015, 4 pages.
"PDCCH CORESET configuration and UE procedure on NR-PDCCH Monitoring," Source: Guangdong OPPO Mobile Telecom, Agenda Item: 7.1.3.1.2, Document for: Discussion and Decision, 3GPP TSG RAN WG1 Meeting #89, R1-1707703, May 15-19, 2017, 7 pages.
"PDCCH Control Resource Set and Search Space," Agenda item: 7.1.3.1.2, Source: Qualcomm Incorporated, Document for: Discussion and Decision, 3GPP TSG RAN WG1 #89, R1-1708610, May 15-19, 2017, 3 pages.
"Other Aspects on Carrier Aggregation," Source: vivo, Agenda Item: 7.3.4.2, Document for: Discussion and Decision, 3GPP TSG RAN WG1 Meeting 91, R1-1719801, Reno, USA, Nov. 27-Dec. 1, 2017, 5 pages.
"Remaining PDSCH HARQ timing on SCell for Inter-Band CA TDD," Source: Pantech, Agenda Item: 7.2.1.5, Document for: Discussion and Decision, 3GPP TSG RAN1 #69, R1-122444, Prague, Czech Republic, May 21-May 25, 2012, 7 pages.

* cited by examiner

| $C_7$ | $C_6$ | $C_5$ | $C_4$ | $C_3$ | $C_2$ | $C_1$ | R | |
|---|---|---|---|---|---|---|---|---|
| 0 | 0 | 0 | 0 | 0 | 0 | 1 | 0 | MAC CE |

UPLINK RESOURCE GRANT METHODS AND APPARATUS

CROSS-REFERENCE TO RELATED APPLICATIONS

This application is a continuation of International Application No. PCT/CN2018/091572, filed on Jun. 15, 2018, which claims priority to Chinese Patent Application No. 201710459797.5, filed on Jun. 16, 2017. The disclosures of the aforementioned applications are hereby incorporated by reference in their entireties.

TECHNICAL FIELD

Embodiments of this application relate to the field of communications technologies, and in particular, to an uplink resource grant method and apparatus, and a system.

BACKGROUND

With a continuous increase in a quantity of users of intelligent terminals, user traffic and data throughputs continuously increase, and requirements for spectrum resources are also increasing. However, there is a shortage of wireless spectrum resources, and it is difficult to find consecutive large-bandwidth resources for mobile communication. Therefore, a carrier aggregation (CA) technology is introduced to aggregate a plurality of consecutive or inconsecutive spectrum resources (for example, carriers), so as to meet the requirements of mobile communication for large bandwidth and increase utilization of scattered spectrums.

Currently, in the CA technology, a terminal can support aggregation of a plurality of carriers, where a quantity of uplink carriers is not greater than a quantity of downlink carriers. In other words, if a carrier is configured for uplink transmission, the carrier also needs to be configured for downlink transmission. Therefore, the use of an uplink resource of the carrier is bound to the use of a downlink resource of the carrier.

However, limited by transmit power of a terminal, uplink coverage and downlink coverage are usually not balanced, and the uplink coverage is weaker than the downlink coverage. With the introduction of high frequency bands, the phenomenon of imbalance between uplink coverage and downlink coverage is more obvious. In addition, from the perspective of services, there is also an imbalance between uplink and downlink service requirements, and the downlink service requirements are often higher than the uplink service requirements. Therefore, it is desirable to implement uplink and downlink decoupling to adapt to the imbalance between uplink and downlink coverage or between uplink and downlink services. When uplink and downlink are decoupled, the use of an uplink resource of a carrier is no longer bound to the use of a downlink resource of the carrier, and there may be only uplink resources on a carrier, or the carrier is used only for uplink transmission. Therefore, there is no downlink resource on the carrier to schedule an uplink resource of the carrier, and a cross-carrier scheduling technology can be used, that is, the uplink resource of the carrier is scheduled by using another carrier. In this case, the terminal needs to perform a large quantity of blind detections, resulting in relatively large power consumption.

SUMMARY

Embodiments of this application provide a search space configuration method and apparatus, and a system, to decrease blind detections of a terminal and reduce power consumption of the terminal.

According to a first aspect, an uplink resource grant method is provided, including: receiving, by a terminal, configuration information from a network device, where the configuration information includes information about a first uplink resource and information about a second uplink resource, and searching, by the terminal, a search space for a downlink control channel to obtain grant information that is sent by the network device to the terminal, where the grant information includes at least one of grant information of the first uplink resource, grant information of the second uplink resource, and grant information of a downlink resource used to carry the downlink control channel. The search space includes a first control channel candidate set when the downlink control channel carries the grant information of the first uplink resource, and the search space includes a second control channel candidate set when the downlink control channel carries the grant information of the second uplink resource and/or the grant information of the downlink resource, or the search space includes a first control channel candidate set when the downlink control channel carries the grant information of the second uplink resource, and the search space includes a second control channel candidate set when the downlink control channel carries the grant information of the first uplink resource and/or the grant information of the downlink resource. In addition, the first control channel candidate set is the same as the second control channel candidate set, or the first control channel candidate set has an offset with respect to the second control channel candidate set, and a quantity of control channel candidates in the first control channel candidate set is less than a quantity of control channel candidates in the second control channel candidate set.

According to a second aspect, an uplink resource grant method is provided, including: sending, by a network device, configuration information to a terminal, where the configuration information includes information about a first uplink resource and information about a second uplink resource, and sending, by the network device, a downlink control channel on a downlink control channel search space, where the downlink control channel includes grant information for the terminal, and the grant information includes at least one of grant information of the first uplink resource, grant information of the second uplink resource, and grant information of a downlink resource used to carry the downlink control channel. The search space includes a first control channel candidate set when the downlink control channel carries the grant information of the first uplink resource, and the search space includes a second control channel candidate set when the downlink control channel carries the grant information of the second uplink resource and/or the grant information of the downlink resource, or the search space includes a first control channel candidate set when the downlink control channel carries the grant information of the second uplink resource, and the search space includes a second control channel candidate set when the downlink control channel carries the grant information of the first uplink resource and/or the grant information of the downlink resource. In addition, the first control channel candidate set is the same as the second control channel candidate set, or the first control channel candidate set has an offset with respect to the second control channel candidate set, and a quantity of control channel candidates in the first control channel candidate set is less than a quantity of control channel candidates in the second control channel candidate set.

According to a third aspect, this application provides an uplink resource grant apparatus, and the apparatus is applied to a terminal and includes units or means configured to perform the steps in the first aspect.

According to a fourth aspect, this application provides an uplink resource grant apparatus, and the apparatus is applied to a network device and includes units or means configured to perform the steps in the second aspect.

According to a fifth aspect, this application provides an uplink resource grant apparatus, including at least one processing element and at least one storage element, where the at least one storage element is configured to store a program and data, and when the apparatus is applied to a terminal, the at least one processing element is configured to perform the method provided in the first aspect of this application, or when the apparatus is applied to a network device, the at least one processing element is configured to perform the method provided in the second aspect of this application.

According to a sixth aspect, this application provides an uplink resource grant apparatus, including at least one processing element (or chip) configured to perform the method according to the first aspect or the second aspect.

According to a seventh aspect, this application provides a program, where when being executed by a processor, the program is used to perform the method according to the first aspect or the second aspect.

According to an eighth aspect, a program product is provided, where the program product is, for example, a computer-readable storage medium and includes the program according to the seventh aspect.

When the first control channel candidate set is the same as the second control channel candidate set, in a case of prior-art cross-carrier scheduling, which is equivalent of that scheduling on two carriers shares a search space, there is no longer an offset between two control channel candidate sets, and one control channel candidate set is directly used to carry grant information, thereby reducing blind detections of the terminal.

When the quantity of control channel candidates in the first control channel candidate set is less than the quantity of control channel candidates in the second control channel candidate set, in a case of prior-art cross-carrier scheduling, although there is an offset between two control channel candidate sets, a quantity of control channel candidates in one of the control channel candidate sets decreases, thereby reducing blind detections of the terminal.

The foregoing first uplink resource is a supplementary uplink (SUL) resource. The SUL resource means that only uplink resources are used for transmission of a current communications standard.

Optionally, the first uplink resource and the downlink resource used to carry the downlink control channel belong to one carrier resource, in this case, scheduling of the first uplink resource is self-carrier scheduling, and scheduling of the second uplink resource is cross-carrier scheduling.

Optionally, the second uplink resource and the downlink resource used to carry the downlink control channel belong to one carrier resource, in this case, scheduling of the first uplink resource is cross-carrier scheduling, and scheduling of the second uplink resource is self-carrier scheduling.

Optionally, the first uplink resource, the second uplink resource, and the downlink resource used to carry the downlink control channel belong to one carrier resource, in this case, both scheduling of the first uplink resource and scheduling of the second uplink resource are self-carrier scheduling, and no cross-carrier scheduling exists.

The foregoing three combinations of the carrier resource break a limitation on an existing uplink/downlink resource pairing manner. The first uplink resource and a downlink resource of a carrier on which the first uplink resource is located may be decoupled, and the second uplink resource and a downlink resource of a carrier on which the second uplink resource is located may also be decoupled. In addition, an uplink resource and a downlink resource of different carriers may be paired, to implement more flexible carrier resource pairing.

Optionally, information about an uplink resource is an index or a frequency channel number. For example, the information about the first uplink resource is an index of the first uplink resource, and the information about the second uplink resource is an index of the second uplink resource. Alternatively, the information about the first uplink resource is a frequency channel number of the first uplink resource, and the information about the second uplink resource is a frequency channel number of the second uplink resource. Using an index or a frequency channel number to indicate a resource can reduce an amount of information transmitted over an air interface and reduce consumption of air interface resources.

Optionally, the terminal activates the first uplink resource and the second uplink resource at different time. In other words, the first uplink resource and the second uplink resource are not simultaneously activated. In this case, the grant information includes the grant information of the first uplink resource, or the grant information includes the grant information of the second uplink resource and/or the grant information of the downlink resource.

The grant information is located in downlink control information (DCI). When the first uplink resource and the second uplink resource are not simultaneously activated, the DCI includes a carrier indicator field, where the carrier indicator field is used to indicate the first uplink resource or the second uplink resource. In another implementation, the DCI includes no carrier indicator field, and the grant information is a grant for an activated uplink resource (for example, the first uplink resource or the second uplink resource).

Optionally, the network device may instruct the terminal to switch an uplink resource. In this case, the foregoing method further includes: sending, by the network device, a switching indication to the terminal device, where the switching indication is used to instruct the terminal to switch the activated uplink resource from the first uplink resource to the second uplink resource or from the second uplink resource to the first uplink resource. Correspondingly, the terminal receives the switching indication and switches an uplink resource according to the switching indication, for example, switches the activated uplink resource from the first uplink resource to the second uplink resource or from the second uplink resource to the first uplink resource. In this case, use of uplink resources of the terminal can be adjusted in a timely manner when the terminal moves, to achieve better communication quality.

Optionally, the switching indication is a carrier indicator field, and the carrier indicator field is used to indicate the first uplink resource or the second uplink resource, and when an uplink resource indicated by the carrier indicator field is different from a currently activated uplink resource, the terminal switches the activated uplink resource to the uplink resource indicated by the carrier indicator field. In this switching method, the carrier indicator field is reused, and provided that a value in the carrier indicator field in scheduling information changes during switching, switching can be quickly implemented without a need to re-establish an RRC connection and without service interruption.

Optionally, the switching indication is group common scheduling information, the group common scheduling information includes a plurality of bits, and each bit corresponds to one terminal and is used to instruct whether to switch an uplink resource of the terminal corresponding to the bit. In an implementation, a quantity of bits in the group common scheduling information may be sent by the network device to the terminal. With this method, uplink resources can be switched for a plurality of terminals in a group simultaneously, and overall switching efficiency is relatively high.

Optionally, the switching indication is media access control layer signaling, the media access control layer signaling includes a plurality of bits, and each bit corresponds to one uplink resource and is used to instruct whether to activate the uplink resource corresponding to the bit.

For each of the foregoing switching methods, there is no need to re-establish a radio resource control (RRC) connection, and no service is interrupted, thereby implementing uplink resource switching quickly.

Before and after the switching, the network device may send the grant information to the terminal at the request of the terminal or actively.

Optionally, the terminal may activate the first uplink resource and the second uplink resource simultaneously, in this case, the grant information includes at least one of the grant information of the first uplink resource, the grant information of the second uplink resource, and the grant information of the downlink resource.

The quantity of control channel candidates in the first control channel candidate set may be predefined or may be configured by the network device for the terminal. When the quantity of control channel candidates in the first control channel candidate set is configured by the network device for the terminal, the foregoing method further includes: sending, by the network device, a configuration parameter to the terminal, where the configuration parameter is used to configure the quantity of control channel candidates in the first control channel candidate set. Correspondingly, the terminal receives the configuration parameter from the network device, and then determines the quantity of control channel candidates in the first control channel candidate set based on the configuration parameter.

Optionally, the configuration parameter is a scale factor, and the scale factor is used to reflect a ratio of the quantity of control channel candidates in the first control channel candidate set to the quantity of control channel candidates in the second control channel candidate set or a ratio of the quantity of control channel candidates in the second control channel candidate set to the quantity of control channel candidates in the first control channel candidate set.

Optionally, the first uplink resource is a low frequency resource, the second uplink resource is a high frequency resource, and the downlink resource is a high frequency downlink resource. The low frequency resource is a resource below or at 3 GHz, and the high frequency resource is a resource above 3 GHz. In this case, the first uplink resource is an SUL resource.

DETAILED DESCRIPTION OF ILLUSTRATIVE EMBODIMENTS

The following describes some terms in the embodiments of this application to facilitate understanding of a person skilled in the aft.

(1) A terminal is also referred to as user equipment (UE), a mobile station (MS), a mobile terminal (MT), or the like, and is a device that provides a user with voice and/or data connectivity, for example, a handheld device or an in-vehicle device with a wireless connection function. Currently, for example, some terminals are a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, and a wireless terminal in a smart home.

(2) A network device is a device that provides services for a terminal in a network, and includes, for example, a radio access network (RAN) device. Currently, for example, some RAN devices are a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), and a WiFi™ access point (AP). In addition, in a network structure, the RAN may include a centralized unit (CU) node and a distributed unit (DU) node. In this structure, protocol layers of an eNB in a long term evolution (LTE) system are split, where functions of some protocol layers are controlled by a CU in a centralized manner, functions of some or all remaining protocol layers are distributed in a DU, and the CU controls DUs in a centralized manner.

(3) "A plurality of" means two or more, and other quantifiers are similar to this. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

Figure 1:
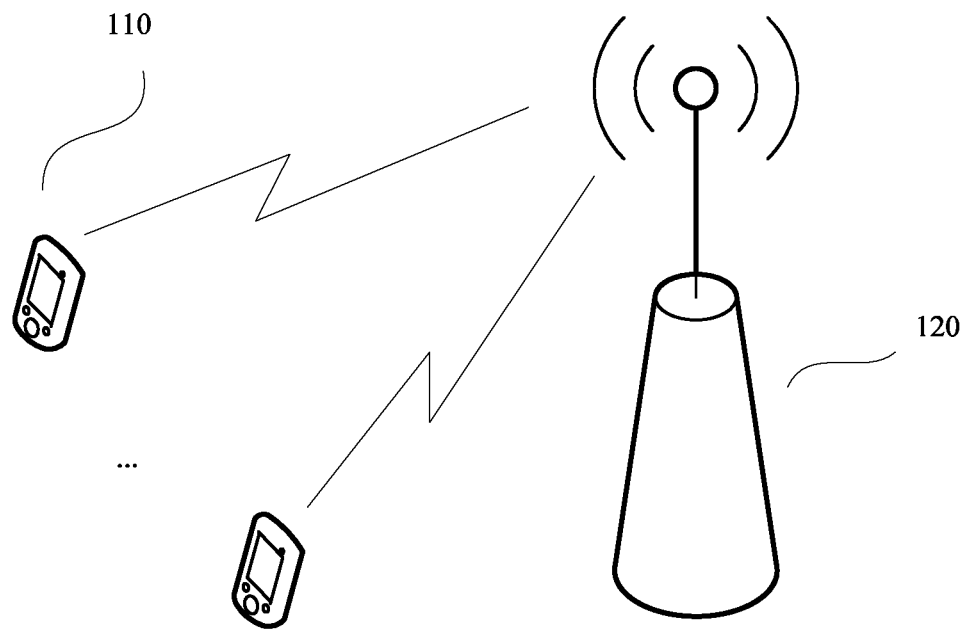
FIG. 1 is a schematic diagram of a communication scenario according to an embodiment of this application.

FIG. 1 is a schematic diagram of a communication scenario according to an embodiment of this application. As shown in FIG. 1, a terminal no accesses a wireless network through a network device 120 to obtain services of an external network (such as the Internet) through the wireless network, or communicate with another terminal through the wireless network. The terminal no initially accesses the network device 120. In this case, a cell accessed by the terminal is a serving cell of the terminal, and the cell is responsible for radio resource control (RRC) communication with the terminal 110.

In a CA technology, the network device 120 may further configure another serving cell for the terminal. For example, during RRC connection reconfiguration, at least one serving cell may be added for the terminal no, and the added serving cell is a secondary serving cell (SCell). In this case, the serving cell initially accessed by the terminal no is a primary serving cell (PCell). The added SCell may be a cell of the network device 120 or a cell of another network device. No limitation is imposed herein. In addition to adding the SCell for the terminal during the RRC connection reconfiguration, the network device 120 may modify or release the SCell for the terminal during RRC connection reconfiguration.

The PCell is responsible for RRC communication with the terminal, and a corresponding CC is a primary component carrier (PCC). The SCell may be added during the RRC connection reconfiguration, to provide additional radio resources for the terminal, and a CC corresponding to the SCell is a secondary component carrier (SCC). A quantity of downlink SCCs may be the same as or different from a quantity of uplink SCCs. Currently, a quantity of uplink CCs is not greater than a quantity of downlink CCs, and if an uplink resource of a CC is used, a downlink resource of the CC is also used. In other words, if a CC is used for uplink transmission, the CC also needs to be configured for downlink transmission. Therefore, the use of the uplink resource of the carrier is bound to the use of the downlink resource of the carrier.

However, limited by transmit power of a terminal, uplink coverage and downlink coverage are usually not balanced, and the uplink coverage is weaker than the downlink coverage. In addition, from the perspective of services, there is also an imbalance between uplink and downlink service requirements, and the downlink service requirements are often higher than the uplink service requirements. Therefore, it is desirable to implement uplink and downlink decoupling to adapt to the imbalance between uplink and downlink coverage or between uplink and downlink services. When uplink and downlink are decoupled, the use of an uplink resource of a carrier is no longer bound to the use of a downlink resource of the carrier, and there may be only uplink resources on a carrier, in other words, the carrier is used only for uplink transmission. Therefore, there is no downlink resource on the carrier to schedule an uplink resource of the carrier, and a cross-carrier scheduling technology can be used, that is, the uplink resource of the carrier is scheduled by using another carrier. In this case, the terminal needs to perform a large quantity of blind detections, resulting in relatively large power consumption.

Figure 2:
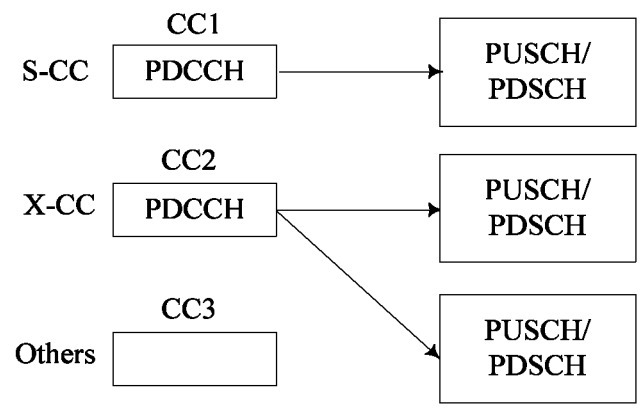
FIG. 2 is a schematic diagram of a carrier scheduling manner according to an embodiment of this application.

The following describes cross-carrier scheduling with reference to FIG. 2. FIG. 2 is a schematic diagram of a carrier scheduling manner according to an embodiment of this application. As shown in FIG. 2, the network device 120 may configure three types of carrier scheduling manners for the terminal no: self-carrier scheduling, cross-carrier scheduling, and cross-carrier scheduled. A CC1, a CC2, and a CC3 are used as examples for description in the figure. On the CC1 using self-carrier scheduling, a downlink control channel is used to schedule a data channel of this carrier, where the downlink control channel is, for example, a physical downlink control channel (PDCCH) or an enhanced physical downlink control channel (EPDCCH). Herein, a PDCCH is used as an example. The data channel includes, for example, a physical uplink shared channel (PUSCH) and/or a physical downlink shared channel (PDSCH). In other words, the downlink control channel of the CC1 is used to carry uplink grant information and/or downlink grant information of this carrier, the uplink grant information is used to indicate a PUSCH resource of this carrier, and the downlink grant information is used to indicate a PDSCH resource of this carrier, where the uplink grant information and/or downlink grant information are/is carried in downlink control information (DCI) on the downlink control channel. In this case, the downlink control channel of the CC1 carries the DCI for scheduling this carrier, and the terminal blindly detects the downlink control channel of the CC1 to obtain the DCI for scheduling this carrier, so as to obtain the uplink grant information and/or downlink grant information of this carrier. The CC1 using self-carrier scheduling may be referred to as an S-CC. On the CC2 using cross-carrier scheduling, a downlink control channel is used to schedule a data channel of another carrier. In other words, the downlink control channel of the CC2 is used to carry uplink grant information and/or downlink grant information of this carrier, and is also used to carry uplink grant information and/or downlink grant information of another carrier, where the uplink grant information and/or downlink grant information of this carrier are/is used to indicate a PUSCH and/or PDSCH resource of this carrier, and the uplink grant information and/or downlink grant information of the another carrier are/is used to indicate a PUSCH and/or PDSCH resource of the another carrier. In this case, the downlink control channel of the CC2 carries both DCI for scheduling this carrier and DCI for scheduling the another carrier, and the terminal blindly detects the downlink control channel of the CC2 to obtain the DCI for scheduling this carrier and the DCI for scheduling the another carrier, so as to obtain the uplink grant information and/or downlink grant information of this carrier and the another carrier. The CC2 using cross-carrier scheduling may be referred to as an X-CC. For the CC3 using cross-carrier scheduled, a data channel of the CC3 is scheduled by another carrier (for example, the CC2), and therefore the terminal does not blindly detect a PDCCH on the CC3.

The blind detection performed on the PDCCH by the terminal is implemented by searching a search space. The search space is a set of control channel candidates. A set of PDCCH candidates is used as an example. The search space $S_k^{(L)}$ at an aggregation level L is defined as a set of PDCCH candidates, and a control channel element (CCE) occupied by a PDCCH candidate m in the search space $S_k^{(L)}$ may be calculated according to the following formula: $L\{(Y_k+m) \mod \lfloor N_{CCE,k}/L \rfloor\}+i$. If a carrier indicator field (CIF) is configured on the PDCCH monitored by the terminal for the serving cell, and the existence of the CIF field indicates the existence of cross-carrier scheduling, that is, the serving cell schedules another serving cell through cross-carrier scheduling, $m'=m+M^{(L)} \cdot n_{CI}$, where $n_{CI}$ is a value of the CIF, and if no CIF is configured for the serving cell, $m'=m$.

$Y_k$ indicates a starting CCE number of the search space, $N_{CCE,k}$ indicates a total quantity of CCEs of a subframe k, $i=0, \ldots, L-1$, and $m=0, \ldots, M^{(L)}-1$. $M^{(L)}$ is a quantity of PDCCH candidates that need to be monitored in the search space, and the quantity is related to an aggregation level, which is, for example, shown in Table 1. A value of the aggregation level L is, for example, taken from a set {1,2,4,8}, which is merely an example and is not intended to limit this application. As the technology advances, the aggregation level may have other values.

TABLE 1

| Type | Search space $S_k^{(L)}$ | | Quantity $M^{(L)}$ of PDCCH candidates |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Figure 3:
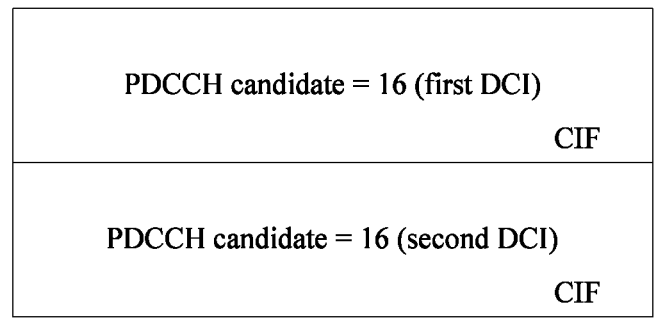
FIG. 3 is a schematic diagram of an existing control channel search space on a serving cell on which cross-carrier scheduling is configured.

It can be learned that if cross-carrier scheduling (in other words, CIF exists) is configured for the terminal, an offset of $M^{(L)} \cdot n_{CI}$ is added when the search space is calculated in a serving cell using cross-carrier scheduling. Therefore, a maximum quantity of PDCCH candidates on which the terminal needs to perform blind detection also doubles. For example, for the CC2 in FIG. 2, the downlink control channel of the serving cell needs to carry both the DCI (referred to as first DCI) for scheduling this carrier and the DCI (referred to as second DCI) for scheduling the another carrier. PDCCH candidates used to carry the second DCI have an offset with respect to PDCCH candidates used to carry the first DCI, but their quantities are unchanged, so that the maximum quantity of PDCCH candidates on which the terminal needs to perform blind detection doubles. FIG. 3 is a schematic diagram of an existing control channel search space on a serving cell on which cross-carrier scheduling is configured. As shown in FIG. 3, for example, a quantity of PDCCH candidates in a PDCCH candidate set used to carry the first DCI and a quantity of PDCCH candidates in a PDCCH candidate set used to carry the second DCI are both 16. In this case, a maximum quantity of blind detections that the terminal needs to perform reaches 64 (16*2+16*2). The reason why it is 16*2 is that the terminal probably has two DCI formats in a specific transmission mode (TM), and when no DCI is detected in one DCI format, the terminal needs to fall back to the other DCI format to perform blind detection.

The above search space is classified into a common search space and a UE-specific search space. The common search space is used to transmit common control information at a cell level, such as control information related to paging, a random access response, and a broadcast control channel (BCCH), and the information is common to terminals in the cell. The UE-specific search space is used to transmit control information related to downlink scheduling (DL-SCH) and/or uplink scheduling (UL-SCH), namely, control information related to a downlink grant and/or an uplink grant. The search space in the following embodiments of this application is a UE-specific search space.

In the embodiments of this application, considering that a quantity of blind detections of the terminal is quite large and a waste of terminal energy is caused, the following solution is proposed.

Figure 4:
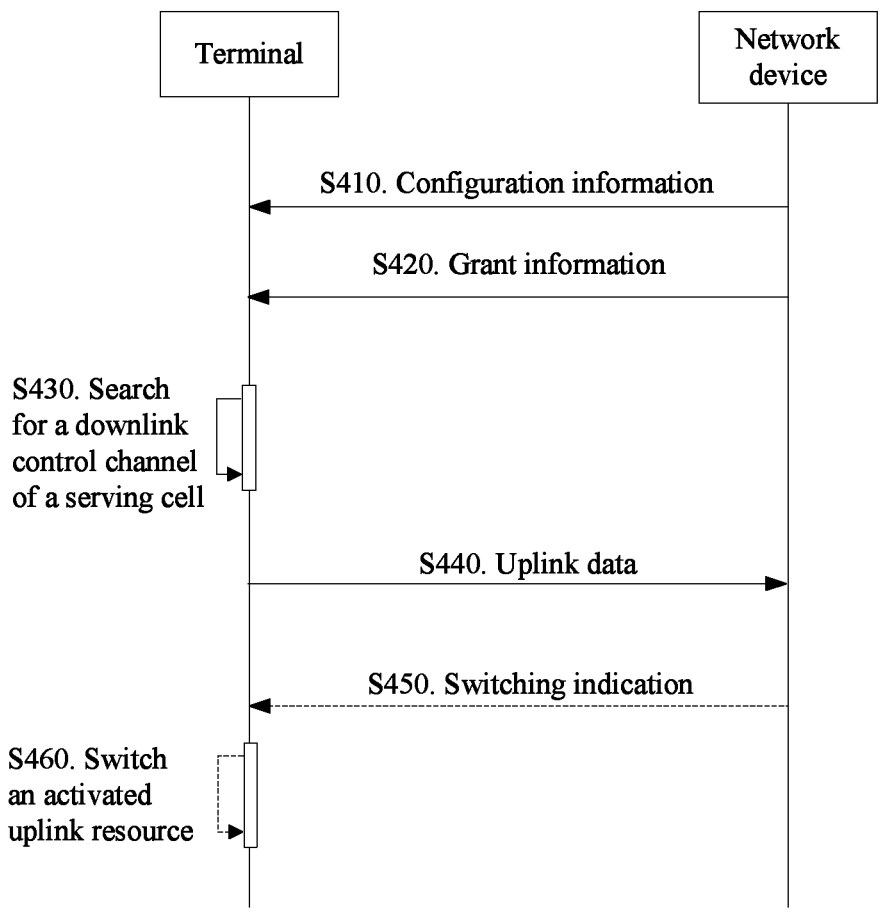
FIG. 4 is a schematic diagram of an uplink resource grant method according to an embodiment of this application.

FIG. 4 is a schematic diagram of an uplink resource grant method according to an embodiment of this application. As shown in FIG. 4, the method includes the following steps.

S410. A network device sends configuration information to a terminal, where the configuration information includes information about a first uplink resource and information about a second uplink resource.

It can be learned that the configuration information is used to configure the first uplink resource and the second uplink resource for the terminal, and the terminal receives the configuration information from the network device, and determines, based on the configuration information, the first uplink resource and the second uplink resource configured by the network device for the terminal. In this way, when receiving grant information of the first uplink resource from the network device, the terminal may use a granted resource in the first uplink resource to perform uplink transmission. When receiving grant information of the second uplink resource from the network device, the terminal may use a granted resource in the second uplink resource to perform uplink transmission. When CA of the first uplink resource and the second uplink resource is configured for the terminal, the terminal may use the granted resource in the first uplink resource and the granted resource in the second uplink resource to perform uplink transmission, when receiving the grant information of the first uplink resource and the grant information of the second uplink resource from the network device.

S420. The network device sends a downlink control channel on a downlink control channel search space, where the downlink control channel includes grant information for the terminal, and the grant information may include at least one of the grant information of the first uplink resource, the grant information of the second uplink resource, and grant information of a downlink resource used to carry the downlink control channel.

S430. The terminal searches for a downlink control channel of a serving cell to obtain the grant information.

S440. The terminal sends uplink data on a resource granted through the grant information.

The grant information in this embodiment of this application may also be referred to as scheduling information, and is used to schedule resources, so as to grant resources for the terminal by using the grant information. Uplink grant information includes an uplink grant (UL grant), and downlink grant information includes a downlink grant (DL grant). The scheduling information is usually carried in DCI or implemented in a form of DCI.

The search space includes a first control channel candidate set when the downlink control channel carries the grant information of the first uplink resource, and the search space includes a second control channel candidate set when the downlink control channel carries the grant information of the second uplink resource and/or the grant information of the downlink resource. Alternatively, the search space includes a first control channel candidate set when the downlink control channel carries the grant information of the second uplink resource, and the search space includes a second control channel candidate set when the downlink control channel carries the grant information of the first uplink resource and/or the grant information of the downlink resource.

The first control channel candidate set is the same as the second control channel candidate set, or the first control channel candidate set has an offset with respect to the second control channel candidate set, and a quantity of control channel candidates in the first control channel candidate set is less than a quantity of control channel candidates in the second control channel candidate set.

In an implementation, the grant information of the first uplink resource and the grant information of the second uplink resource may share a downlink control channel search space. In other words, a control channel candidate set included in the downlink control channel search space when the downlink control channel carries the grant information of the first uplink resource is the same as a control channel candidate set included in the downlink control channel search space when the downlink control channel carries the grant information of the second uplink resource. When the first uplink resource and the second uplink resource are a first uplink CC and a second uplink CC, respectively, in contrast to the prior art, in a case of cross-carrier scheduling, an offset between two control channel candidate sets does not exist, and one control channel candidate set is directly used to carry grant information of the first uplink CC and grant information of the second uplink CC, thereby reducing blind detections of the terminal.

In another implementation, the grant information of the first uplink resource (or the second uplink resource) and the grant information of the downlink resource used to carry the downlink control channel may share a downlink control channel search space. In other words, a control channel candidate set included in the search space when the downlink control channel carries the grant information of the first uplink resource (or the second uplink resource) is the same as a control channel candidate set included in the search space when the downlink control channel carries the grant information of the downlink resource. When the first uplink resource and the downlink resource belong to different CCs, in contrast to the prior art, in a case of cross-carrier scheduling, an offset between two control channel candidate sets does not exists, and one control channel candidate set is directly used to carry grant information of the first uplink CC and grant information of a downlink CC, thereby reducing blind detections of the terminal.

Certainly, these two cases may be combined, in other words, the grant information of the first uplink resource, the grant information of the second uplink resource, and the grant information of the downlink resource used to carry the downlink control channel may share a downlink control channel search space. In other words, a control channel candidate set included in the search space when the downlink control channel carries the grant information of the first uplink resource, a control channel candidate set included in the search space when the downlink control channel carries the grant information of the second uplink resource, and a control channel candidate set included in the search space when the downlink control channel carries the grant information of the downlink resource are the same.

In another implementation, the first control channel candidate set included in the downlink control channel search space when the downlink control channel carries the grant information of the first uplink resource has an offset with respect to the second control channel candidate set included in the downlink control channel search space when the downlink control channel carries the grant information of the second uplink resource, and a quantity of control channel candidates in the first control channel candidate set is less than a quantity of control channel candidates in the second control channel candidate set. Alternatively, the first control channel candidate set included in the downlink control channel search space when the downlink control channel carries the grant information of the second uplink resource has an offset with respect to the second control channel candidate set included in the downlink control channel search space when the downlink control channel carries the grant information of the first uplink resource, and a quantity of control channel candidates in the first control channel candidate set is less than a quantity of control channel candidates in the second control channel candidate set. In contrast to the prior art, in a case of cross-carrier scheduling, although an offset exists between two control channel candidate sets, a quantity of control channel candidates in one of the control channel candidate sets decreases, thereby reducing blind detections of the terminal.

The first uplink resource is a supplementary uplink (SUL) resource, such as an SUL carrier or frequency, and the SUL resource means that only uplink resources are used for transmission of a current communications standard. For example, for a carrier, only uplink resources are used for transmission. For example, in a fifth generation (5G) mobile communications system, also referred to as a new radio (NR) communications system, a carrier A is used only for NR uplink transmission, and the carrier is not used for downlink transmission or is used for downlink transmission of a long term evolution (LTE) communications system but not for NR downlink transmission, and therefore the carrier A is an SUL resource.

The uplink resource may be understood as a part, used for uplink transmission, of a carrier (including a carrier in a non-CA scenario and a CC in a CA scenario) or a part, used for uplink transmission, of a serving cell (including a serving cell in a CA scenario and a serving cell in a non-CA scenario). The CC in the CA scenario may be a primary CC or a secondary CC, and the serving cell in the CA scenario may be a PCell or an Scell. The uplink resource may also be referred to as an uplink carrier. Correspondingly, the part, used for downlink transmission, of the carrier or the serving cell may be understood as a downlink resource or a downlink carrier. For example, in a frequency division duplex (FDD) system, a frequency resource, used for uplink transmission, on a carrier may be understood as a uplink resource or a uplink carrier, and a frequency resource, used for downlink transmission, on the carrier may be understood as a downlink resource or a downlink carrier. For another example, in a time division duplex (TDD) system, a time domain resource, used for uplink transmission, on a carrier may be understood as a uplink resource or a uplink carrier, and a time domain resource, used for downlink transmission, on the carrier may be understood as a downlink resource or a downlink carrier.

In an implementation, the first uplink resource and a downlink resource of a carrier on which the first uplink resource is located may be decoupled, and the second uplink resource and a downlink resource of a carrier on which the second uplink resource is located may also be decoupled. In other words, an uplink carrier and a downlink carrier may be separately configured. The first uplink resource and the downlink resource used to carry the downlink control channel may be configured as one carrier resource, in this case, scheduling of the first uplink resource is self-carrier scheduling, and scheduling of the second uplink resource is cross-carrier scheduling. Alternatively, the second uplink resource and the downlink resource used to carry the downlink control channel may be configured as one carrier resource, in this case, scheduling of the first uplink resource is cross-carrier scheduling, and scheduling of the second uplink resource is self-carrier scheduling. Alternatively, the first uplink resource, the second uplink resource, and the downlink resource used to carry the control channel may be configured as one carrier resource, in this case, both scheduling of the first uplink resource and scheduling of the second uplink resource are self-carrier scheduling, and no cross-carrier scheduling exists.

Optionally, the quantity of control channel candidates in the first control channel candidate set and the quantity of control channel candidates in the second control channel candidate set may be configured by the network device for the terminal, or may be predefined. Alternatively, the quantity of control channel candidates in the second control channel candidate set may be determined in the same manner as the prior art, and the first control channel candidate set is configured by the network device for the terminal. Specifically, the network device may send a configuration parameter to the terminal, where the configuration parameter may be a scale factor that is used to reflect a ratio of the quantity of control channel candidates in the first control channel candidate set to the quantity of control channel candidates in the second control channel candidate set, or a ratio of the quantity of control channel candidates in the second control channel candidate set to the quantity of control channel candidates in the first control channel candidate set.

In step S410, the network device may send the configuration information to the terminal by using higher-layer signaling. The higher-layer signaling is, for example, an RRC message. Alternatively, the network device may send the configuration information to the terminal by using system information. This is not limited in this application.

In addition, the information about the first uplink resource and the information about the second uplink resource in the configuration information may be an index of the first uplink resource and an index of the second uplink resource, respectively. Alternatively, the information about the first uplink resource and the information about the second uplink resource are a frequency channel number of the first uplink resource and a frequency channel number of the second uplink resource, respectively. Using an index or a frequency channel number to indicate a resource can reduce an amount of information transmitted over an air interface and reduce consumption of air interface resources. The information about the first uplink resource and the information about the second uplink resource may be alternatively in other forms, provided that the first uplink resource and the second uplink resource can be indicated. This is not limited in this application.

The network device may configure the first uplink resource and the second uplink resource for the terminal based on a capability of the terminal. Therefore, before step S410, the network device may receive capability information reported by the terminal. The capability information may be, for example, a capability of the terminal to support uplink resources, that is, how many uplink resources can be configured for the terminal, for example, how many uplink CCs can be configured for the terminal. After receiving the capability information reported by the terminal, the network device may learn, based on the capability information, whether a plurality of uplink resources can be configured for the terminal, and if the plurality of uplink resources can be configured for the terminal, configure the first uplink resource and the second uplink resource for the terminal. Certainly, the network device may further configure more uplink resources. Optionally, the capability information may further include a frequency combination capability, to be specific, indicating resources of which frequencies can be combined and jointly configured for the terminal, and then the network device configures uplink resources for the terminal based on the frequency combination capability.

After receiving the configuration information sent by the network device, the terminal may determine the first uplink resource and the second uplink resource based on the configuration information. Optionally, the terminal may choose to activate one of the uplink resources for communication, and if uplink CA is supported, the network device instructs the terminal to activate the other uplink resource to provide an additional uplink resource. Alternatively, the network device may send indication information to the terminal to instruct the terminal to activate one or both of the uplink resources for uplink transmission. Then, the network device may send the grant information of the first uplink resource and/or the second uplink resource to the terminal, so that the terminal learns of, based on the grant information, a resource granted by the network device to the terminal, and transmits uplink data by using the granted resource.

In steps S420 to S440, the network device adds the grant information of the first uplink resource to first DCI and sends the first DCI to the terminal, and adds the grant information of the second uplink resource to second DCI and sends the second DCI to the terminal. In this case, the network device sends, through the downlink control channel of the serving cell, the first DCI or the second DCI or both the first DCI and the second DCI. When the grant information includes only the grant information of the first uplink resource, the terminal may obtain a granted resource in the first uplink resource based on the grant information of the first uplink resource, and transmit uplink data by using the granted resource. When the grant information includes only the grant information of the second uplink resource, the terminal may obtain a granted resource in the second uplink resource based on the grant information of the second uplink resource, and transmit uplink data by using the granted resource. When the grant information includes both the grant information of the first uplink resource and the grant information of the second uplink resource, the terminal supports uplink CA and may transmit uplink data by using a granted resource in the first uplink resource that is indicated by the grant information of the first uplink resource and a granted resource in the second uplink resource that is indicated by the grant information of the second uplink resource.

In addition, when the grant information includes grant information of a downlink resource, the terminal may receive downlink data on a resource specified by the grant information.

The downlink control channel may be a PDCCH or an ePDCCH. The downlink control channel is received by the terminal through searching the search space, where the search space includes a plurality of control channel candidates, and the terminal sequentially detects the control channel candidates until the DCI is detected or until all control channel candidates are detected. When the control channel carries a plurality of pieces of DCI, the network device may notify the terminal of a quantity of pieces of DCI carried by the control channel, so that the terminal can stop detecting when the corresponding quantity of pieces of DCI are detected, so as to further reduce blind detections.

Before NR is introduced, mobile communications systems use spectrum resources of relatively low frequency bands, for example, frequency bands below or at 3 GHz (including 3 GHz). Spectrum resources of higher frequency bands, for example, spectrum resources above 3 GHz, are introduced. However, a higher frequency band indicates lower wireless transmission performance such as a greater path loss. To improve an uplink coverage capability of an NR network, the NR network may reuse a frequency band of an existing network such as a frequency band in an LTE network, decouple uplink from downlink, and reuse the frequency band only on an uplink.

Figure 5:
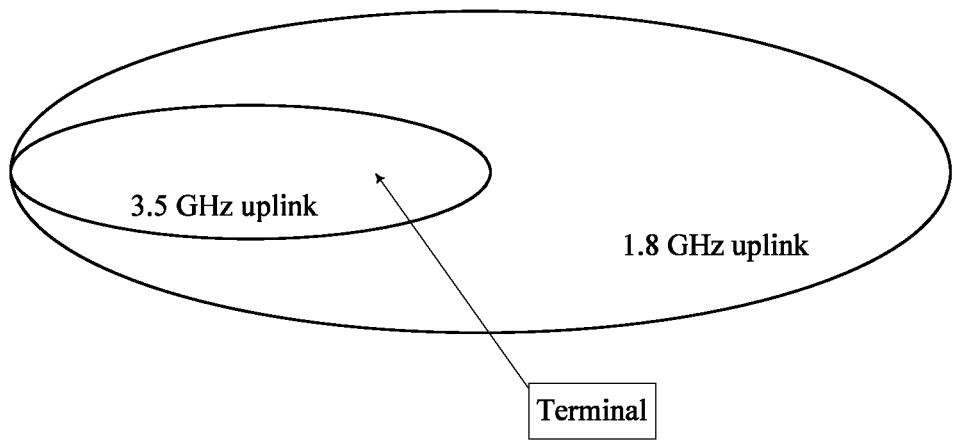
FIG. 5 is a schematic diagram of coverage scenarios of different frequency bands according to an embodiment of this application.

The following provides description by using an example in which the frequency band is a 1.8 GHz frequency band with reference to FIG. 5. FIG. 5 is a schematic diagram of coverage scenarios of different frequency bands according to an embodiment of this application. As shown in FIG. 5, on an uplink, the NR network reuses a frequency band of 1.8 GHz, which is referred to as a 1.8 GHz frequency band below, of the LTE network. On a downlink, the NR network uses a frequency band of 3.5 GHz, which is referred to as a 3.5 GHz frequency band below. NR uplink and LTE uplink share a same frequency band resource. This not only fully utilizes uplink spectrum resources, but also improves NR uplink coverage. In this case, the 1.8 GHz frequency band is an SUL resource, for the 3.5 GHz frequency band, uplink resources of the 1.8 GHz frequency band are scheduled through cross-carrier scheduling, or the 1.8 GHz frequency band and the 3.5 GHz frequency band form one carrier resource. In this case, the above method may be used to reduce blind detections of the terminal. The following may use this scenario as an example to describe application of the foregoing embodiment to this scenario.

The following first describes a scenario in which only one uplink resource is activated at a same moment, namely, a scenario in which the first uplink resource and the second uplink resource are not simultaneously activated. For example, when the terminal does not support uplink CA, the first uplink resource and the second uplink resource are not simultaneously activated.

The terminal camps on an NR 3.5 GHz downlink resource (or downlink carrier), and uses a 1.8 GHz uplink resource (or uplink carrier). In this case, an uplink grant (UL grant) of the 1.8 GHz uplink resource needs to be transmitted through a control channel on the 3.5 GHz downlink resource.

In a conventional carrier design, a 3.5 GHz uplink resource and a 3.5 GHz downlink resource belong to a same carrier. When the terminal is in a 3.5 GHz uplink coverage area, an uplink grant of the 3.5 GHz uplink resource is transmitted through a control channel on the 3.5 GHz downlink resource, in this case, self-carrier scheduling is used. When the terminal moves outside the uplink coverage area and is handed over to a 1.8 GHz uplink coverage area, an uplink grant of a 1.8 GHz uplink resource is transmitted through a control channel on the 3.5 GHz downlink resource, in this case, cross-carrier scheduling is used.

In an uplink and downlink decoupling carrier design, a 1.8 GHz uplink resource and a 3.5 GHz downlink resource belong to a same carrier resource. When the terminal is in a 1.8 GHz uplink coverage area, an uplink grant of the 1.8 GHz uplink resource is transmitted through a control channel on the 3.5 GHz downlink resource, in this case, self-carrier scheduling is used. A 3.5 GHz uplink resource may belong to a same carrier resource as the 1.8 GHz uplink resource and the 3.5 GHz downlink resource, in this case, a grant for the 3.5 GHz uplink resource may also be implemented through self-carrier scheduling. If the 3.5 GHz uplink resource and the 3.5 GHz downlink resource do not belong to a same carrier resource, a grant for the 3.5 GHz uplink resource is implemented through cross-carrier scheduling.

Because the terminal has only one uplink resource activated at one moment, that is, the terminal transmits information on only one uplink resource at one moment, the terminal may use a same control channel candidate set to carry uplink information of the 1.8 GHz uplink resource and the 3.5 GHz uplink resource when using the 1.8 GHz uplink resource and the 3.5 GHz uplink resource. Uplink information transmitted by the terminal may include at least one of the following: information on a PUSCH, information on a PUCCH, a sounding reference signal (SRS), and information on a physical random access channel (PRACH).

Figure 6:
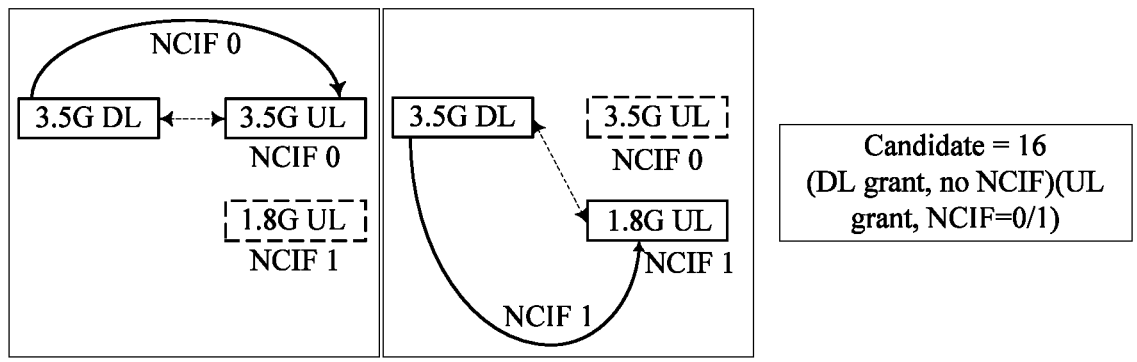
FIG. 6 is a schematic diagram of scheduling and a search space according to an embodiment of this application.

FIG. 6 is a schematic diagram of scheduling and a search space according to an embodiment of this application. As shown in FIG. 6, a dashed line represents an inactive uplink resource, a solid line represents an active uplink resource, a solid-line arrow represents scheduling, and a dashed-line arrow represents that resources on both sides of the arrow belong to one carrier resource. In the left box, a 3.5 GHz uplink resource is activated, and a control channel on a 3.5 GHz downlink resource is used to carry grant information of the 3.5 GHz uplink resource. In the right box, a 1.8 GHz uplink resource is activated, and a control channel on the 3.5 GHz downlink resource is used to carry grant information of the 1.8 GHz uplink resource. In addition, regardless of an uplink resource whose grant information is carried on the control channel on the 3.5 GHz downlink resource, control channel candidate sets of the search space are the same. For example, the control channel candidate set also includes 16 control channel candidates, in this case, a maximum quantity of blind detections of the terminal is only 32. Compared with the prior art, blind detections are reduced, and power consumption of the terminal is reduced.

The network device may configure a mode of reusing a CIF for the terminal. To distinguish from an existing CIF, the CIF field may be referred to as a new carrier indicator field (NCIF). It is assumed that an index of the 3.5 GHz uplink resource configured by the network device is "0", and that an index of the 1.8 GHz uplink resource configured by the network device is "1". A value of an NCIF field in DCI that carries an uplink grant of the 3.5 GHz uplink resource is "0", and a value of an NCIF field in DCI that carries an uplink grant of the 1.8 GHz uplink resource is "1". It can be learned that the NCIF is used to indicate the first uplink resource or the second uplink resource, and the value of the NCIF may be the information about the first uplink resource or the information about the second uplink resource. Then the terminal may determine, based on the value of the NCIF field, that an uplink grant is for the first uplink resource or the second uplink resource.

Figure 7:
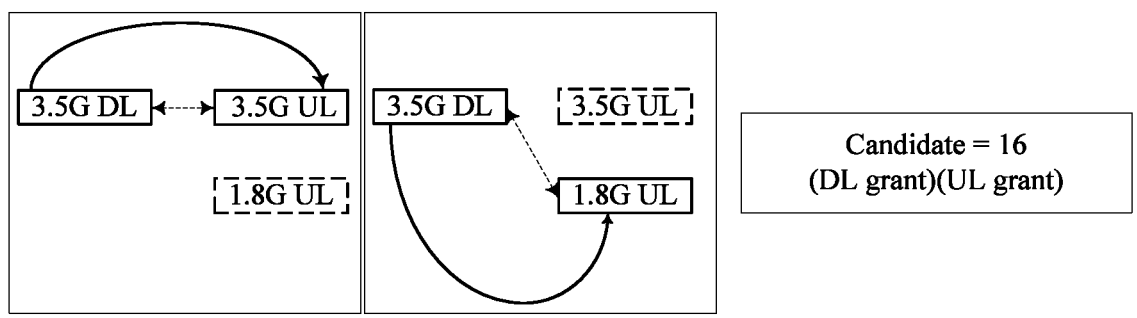
FIG. 7 is another schematic diagram of scheduling and a search space according to an embodiment of this application.

FIG. 7 is another schematic diagram of scheduling and a search space according to an embodiment of this application. The scheduling manner and search space in FIG. 7 are the same as those in FIG. 6. A difference is that the network device does not configure the mode of reusing a CIF for the terminal. Therefore, DCI that carries an uplink grant of the 1.8 GHz or 3.5 GHz uplink resource includes no CIF, and the uplink grant is for an active uplink resource. For example, if the 1.8 GHz uplink resource is currently activated, the uplink grant is a grant for the 1.8 GHz uplink resource.

An uplink resource activated by the terminal may be switched, for example, from the first uplink resource to the second uplink resource or from the second uplink resource to the first uplink resource. Still referring to FIG. 4, the above method may further include the following step.

S450. The network device sends a switching indication to the terminal, where the switching indication is used to instruct the terminal to switch the activated uplink resource from the first uplink resource to the second uplink resource or from the second uplink resource to the first uplink resource.

The terminal receives the switching indication and performs the following operation:

S460. The terminal switches, according to the switching indication, the activated uplink resource from the first uplink resource to the second uplink resource or from the second uplink resource to the first uplink resource.

A method for the switching may be implemented in the foregoing mode of reusing a CIF field. To be specific, the switching indication is the CIF. When an uplink resource indicated by the CIF is different from the currently activated uplink resource, the activated uplink resource is switched to the uplink resource indicated by the CIF. For example, the currently activated uplink resource is the 3.5 GHz uplink resource, the CIF field is "1", and "1" is an index of the 1.8 GHz uplink resource. Therefore, the terminal deactivates the 3.5 GHz uplink resource and activates the 1.8 GHz uplink resource, to implement uplink resource switching.

Figures 8, 9:
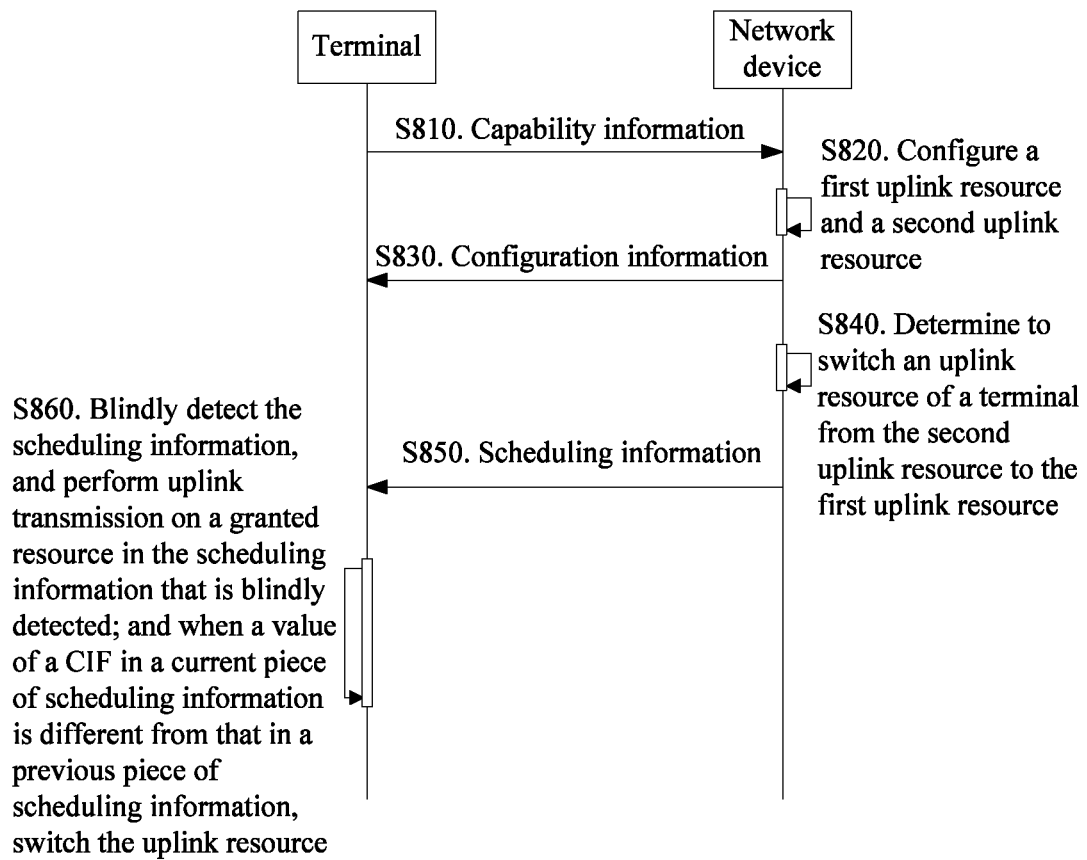
FIG. 8 is a schematic diagram of an uplink resource switching method according to an embodiment of this application.
FIG. 9 is a schematic diagram of group common scheduling information according to an embodiment of this application.

FIG. 8 is a schematic diagram of an uplink resource switching method according to an embodiment of this application. In this embodiment, a 1.8 GHz uplink resource and a 3.5 GHz uplink resource are used as an example for description, and a terminal completes RRC connection establishment on a 3.5 GHz downlink resource and the 3.5 GHz uplink resource. As shown in FIG. 8, the method includes the following steps.

S810. The terminal reports capability information, where the capability information is used to indicate a capability of the terminal to support uplink resources.

A network device receives the capability information and performs the following step S820.

S820. The network device configures, for the terminal based on the capability information, a first uplink resource and a second uplink resource, which are the 1.8 GHz uplink resource and the 3.5 GHz uplink resource, respectively. An index of the 3.5 GHz uplink resource is "0", and an index of the 1.8 GHz uplink resource is "1".

S830. The network device sends configuration information to the terminal, where the configuration information is used to configure the first uplink resource and the second uplink resource for the terminal, that is, the configuration information includes an index of the first uplink resource and an index of the second uplink resource, and the configuration information may be an RRC message.

The terminal receives the configuration information and learns, based on the configuration information, that the first uplink resource and the second uplink resource are configured for the terminal.

S840. The network device determines to switch an uplink resource of the terminal from the second uplink resource to the first uplink resource.

For example, the terminal reports a measurement report to the network device, where the measurement report shows that channel quality of the terminal on the 3.5 GHz uplink resource is less than or equal to a threshold, for example, a reference signal received power (RSRP) of the terminal on the 3.5 GHz uplink resource is less than or equal to an RSRP threshold, which indicates that the terminal is about to move outside coverage of the 3.5 GHz uplink resource, and therefore the network device determines to switch the uplink resource of the terminal from 3.5 GHz to 1.8 GHz.

For another example, the network device learns through measurement that a rate of uplink data of the terminal is less than a rate threshold, which indicates that the terminal is about to move outside coverage of the 3.5 GHz uplink resource, and therefore the network device determines to switch the uplink resource of the terminal from 3.5 GHz to 1.8 GHz.

S850. The network device sends scheduling information to the terminal, where the scheduling information is, for example, DCI, and a value of a CIF in the scheduling information is "1".

Optionally, the scheduling information may further include a scheduling delay K1, to indicate that the terminal may transmit uplink data on the 1.8 GHz uplink resource after the time K1 from receiving of the scheduling information, in other words, the uplink resource switching is completed before the scheduling delay K1. After the switching, the grant information includes grant information of the 1.8 GHz uplink resource.

Optionally, the scheduling information may alternatively not include the scheduling delay K1, and it is specified by default or predefined that the terminal completes the uplink resource switching within a switching time K2 after receiving of a switching indication. Alternatively, an RRC message may be used to configure a switching time K3 within which the terminal completes the uplink resource switching.

In addition, the switching time K2 may be predefined or the switching time K3 may be configured, and the scheduling delay K1 is carried in the scheduling information. Herein, K1 is greater than or equal to K2, or K1 is greater than or equal to K3.

S860. The terminal blindly detects the scheduling information on a downlink control channel and performs uplink transmission on a granted resource in the scheduling information that is blindly detected. When a value of a CIF in a current piece of scheduling information is different from that in a previous piece of scheduling information, the terminal switches the uplink resource.

For example, an activated uplink resource before switching is a 3.5 GHz uplink resource, and an activated uplink resource after switching is a 1.8 GHz uplink resource. Before switching, the terminal transmits at least one of a PUSCH, a PUCCH, an SRS, and a PRACH on the 3.5 GHz uplink resource, and does not transmit any information or transmits only an SRS and/or a PRACH on the 1.8 GHz uplink resource. After switching, the terminal transmits at least one of a PUSCH, a PUCCH, an SRS, and a PRACH on the 1.8 GHz uplink resource, and does not transmit any information or transmits only an SRS and/or a PRACH on the 3.5 GHz uplink resource.

In the foregoing switching method, switching can be implemented quickly provided that a value of the CIF in the scheduling information changes during switching. The RRC connection does not need to be re-established, and no service is interrupted.

The uplink resource switching may be alternatively implemented by using group common scheduling information, for example, group common DCI. The group common scheduling information means that the scheduling information is valid for all terminals in a terminal group. FIG. 9 is a schematic diagram of group common scheduling information according to an embodiment of this application. As shown in FIG. 9, the group common scheduling information includes a plurality of bits, each bit corresponds to one terminal, and a value of each bit is used to indicate whether the corresponding terminal needs to switch an uplink resource. A quantity of bits of the group common scheduling information may be configured by the network device and sent to the terminal by using RRC signaling. Herein, for example, the group common scheduling information includes 5 bits, and the 5 bits correspond to terminals 1 to 5, where a value of a first bit is "1", indicating that an uplink resource of the terminal 1 needs to be switched. Certainly, "0" may be alternatively used to indicate that an uplink resource needs to be switched. This is not limited in this application.

Figures 10, 11:
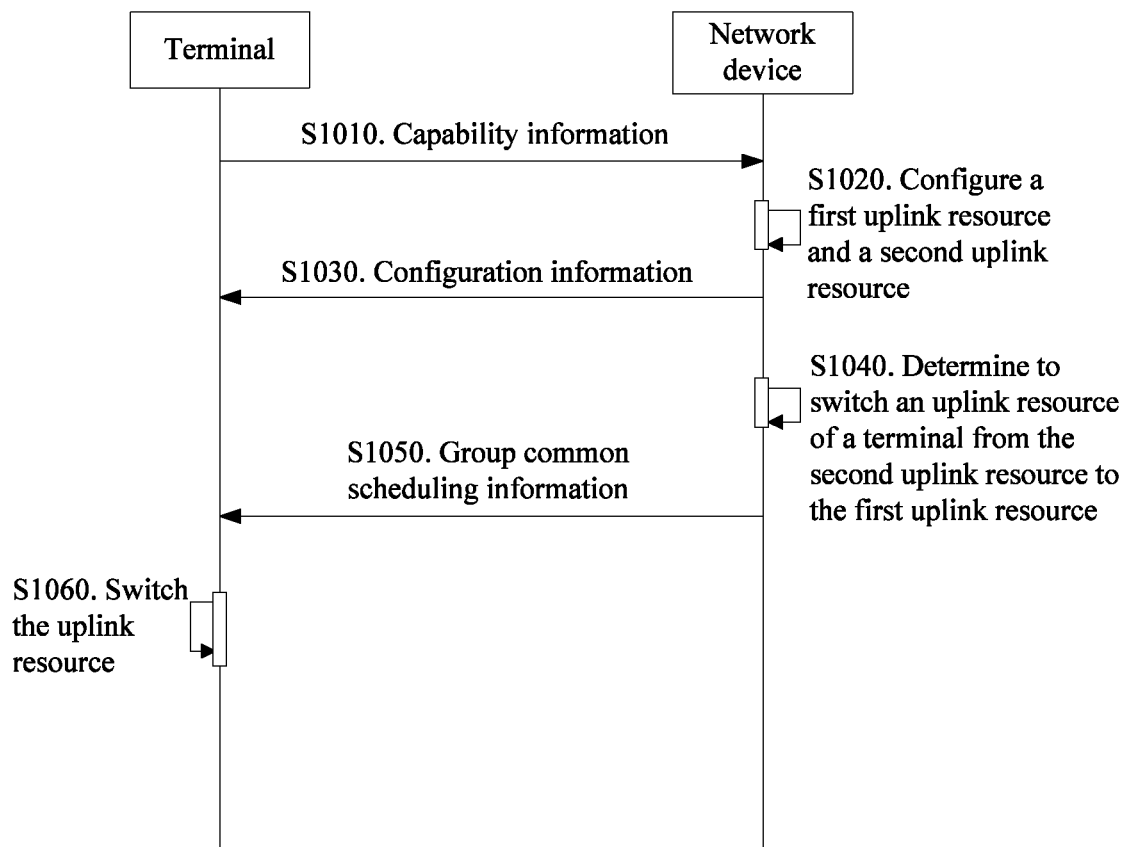
FIG. 10 is a schematic diagram of another uplink resource switching method according to an embodiment of this application.
FIG. 11 is a schematic diagram of MAC layer signaling according to an embodiment of this application.

FIG. 10 is a schematic diagram of another uplink resource switching method according to an embodiment of this application. The method includes steps S1010 to S1040, which are similar to steps S810 to S840 in the embodiment shown in FIG. 8 and are not further described herein again. The difference lies between steps S850 and S860 and steps S1050 and S1060.

S1050. The network device sends group common scheduling information to the terminal, where the group common scheduling information has the structure described above, and one of the bits is used to indicate whether the terminal performs uplink resource switching. The network device sets a value of the bit corresponding to the terminal to "1".

S1060. The terminal switches the uplink resource.

Optionally, the terminal may detect the group common scheduling information in a preset time unit or a time unit configured by the network device. The time unit is, for example, a slot or a mini-slot.

The uplink resource switching may also be implemented by using media access control (MAC) layer signaling, and the MAC layer signaling is, for example, a MAC control element (MAC CE). FIG. 11 is a schematic diagram of MAC layer signaling according to an embodiment of this application. As shown in FIG. 11, the MAC layer signaling includes a plurality of bits, each bit corresponds to one uplink resource, and a value of each bit is used to instruct whether to activate the corresponding uplink resource. Herein, for example, the MAC layer signaling includes 8 bits which may include at least one reserved bit (R) and bits other than the reserved bit each correspond to one uplink resource, for example, bits other than the reserved bits correspond to uplink resources C1 to C7 respectively from right to left, where C1 represents a 1.8 GHz uplink resource, a value of the bit corresponding to C1 is "1" and is used to instruct to activate the 1.8 GHz uplink resource, and in this case, values of the other bits are "0". Certainly, "0" may be alternatively used to instruct to activate the 1.8 GHz uplink resource, which is not limited in this application, in this case, values of the other bits are "1".

Figure 12:
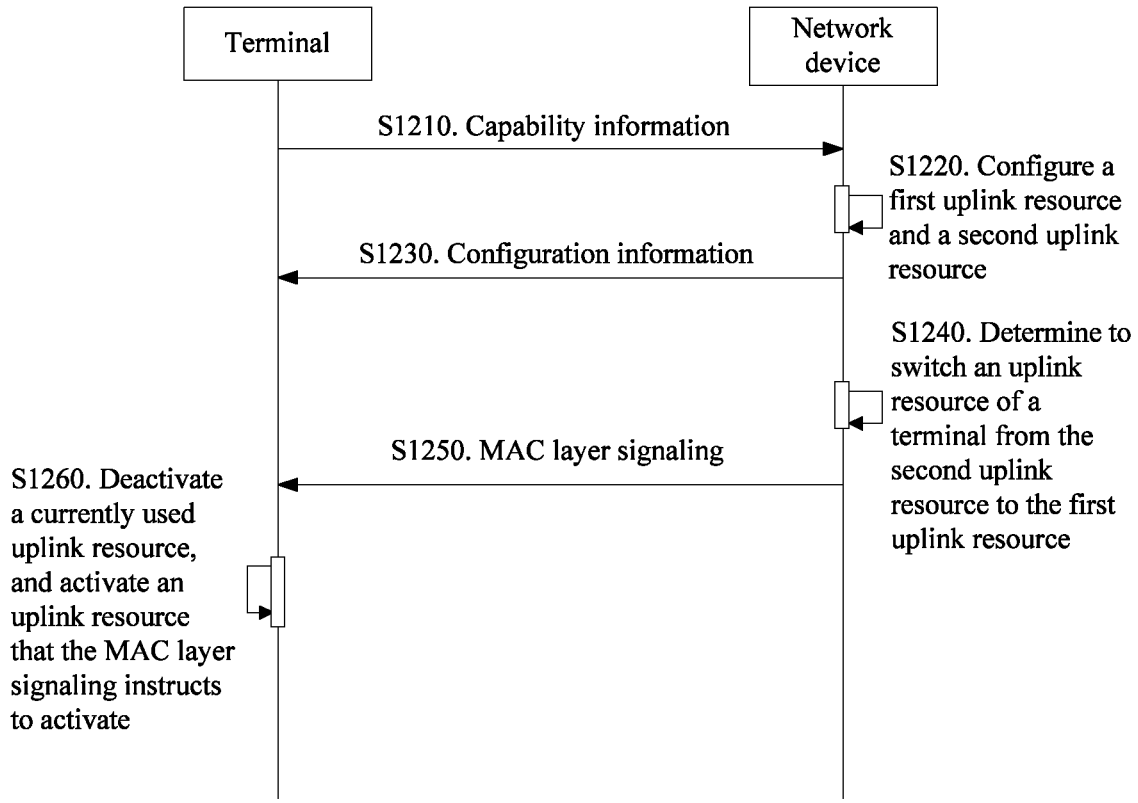
FIG. 12 is a schematic diagram of another uplink resource switching method according to an embodiment of this application.

FIG. 12 is a schematic diagram of another uplink resource switching method according to an embodiment of this application. The method includes steps S1210 to S1240, which are similar to steps S810 to S840 in the embodiment shown in FIG. 8 and are not further described herein again. The difference lies between steps S850 and S860 and steps S1250 and S1260.

S1250. The network device sends MAC layer signaling to the terminal, where the MAC layer signaling has the structure described above, and one of the bits is used to indicate an uplink resource to be activated by the terminal. The network device sets a value of the bit corresponding to the uplink resource to "1".

S1260. The terminal deactivates a currently used uplink resource, and activates the uplink resource that the MAC layer signaling instructs to activate, to implement uplink resource switching.

Before and after the switching, the network device may send grant information to the terminal at the request of the terminal or actively. A method for sending the grant information and a downlink control channel search space that carries the grant information are the same as those described in the foregoing embodiment. Details are not described herein again.

For each of the foregoing switching methods, there is no need to re-establish an RRC connection, and no service is interrupted, thereby implementing uplink resource switching quickly.

Next, a scenario in which the first uplink resource and the second uplink resource may be simultaneously activated is described. For example, when the terminal supports uplink CA, the first uplink resource and the second uplink resource may be simultaneously activated.

The terminal camps on an NR 3.5 GHz downlink resource (or downlink carrier), and uses a 1.8 GHz uplink resource (or uplink carrier). In this case, an uplink grant (UL grant) of the 1.8 GHz uplink resource needs to be transmitted through a control channel on the 3.5 GHz downlink resource.

In a conventional carrier design, a 3.5 GHz uplink resource and a 3.5 GHz downlink resource belong to a same carrier. When the terminal is in a 3.5 GHz uplink coverage area, an uplink grant of the 3.5 GHz uplink resource is transmitted through a control channel on the 3.5 GHz downlink resource, in this case, self-carrier scheduling is used. When the terminal moves outside the uplink coverage area and is handed over to a 1.8 GHz uplink coverage area, an uplink grant of a 1.8 GHz uplink resource is transmitted through a control channel on the 3.5 GHz downlink resource, in this case, cross-carrier scheduling is used.

In an uplink and downlink decoupling carrier design, a 1.8 GHz uplink resource and a 3.5 GHz downlink resource belong to a same carrier resource. When the terminal is in a 1.8 GHz uplink coverage area, an uplink grant of the 1.8 GHz uplink resource is transmitted through a control channel on the 3.5 GHz downlink resource, in this case, self-carrier scheduling is used. A 3.5 GHz uplink resource may belong to a same carrier resource as the 1.8 GHz uplink resource and the 3.5 GHz downlink resource, in this case, a grant for the 3.5 GHz uplink resource may also be implemented through self-carrier scheduling. If the 3.5 GHz uplink resource and the 3.5 GHz downlink resource may not belong to a same carrier resource, a grant for the 3.5 GHz uplink resource is implemented through cross-carrier scheduling.

Figure 13:
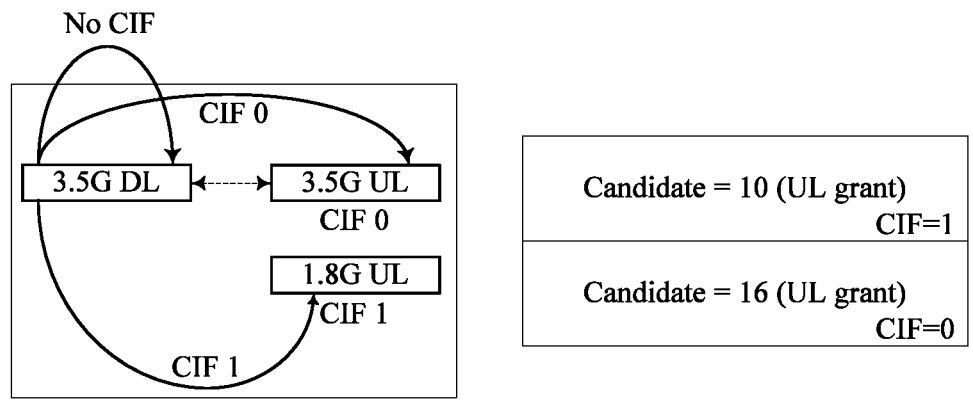
FIG. 13 is still another schematic diagram of scheduling and a search space according to an embodiment of this application.

Because 1.8 GHz is not used for downlink transmission or a 1.8 GHz downlink resource is used for LTE, in other words, 1.8 GHz is an SUL resource, and there is no cross-carrier scheduling for the 1.8 GHz downlink resource, control channel candidates can be reduced in configuration of cross-carrier scheduling search space, thereby reducing blind detections of the terminal. FIG. 13 is still another schematic diagram of scheduling and a search space according to an embodiment of this application. As shown in FIG. 13, a solid line represents an activated uplink resource, a solid-line arrow represents scheduling, and a dashed-line arrow represents that resources on both sides of the arrow belong to one carrier resource. In FIG. 13, control channel candidates used for 1.8 GHz are fewer than those used for 3.5 GHz, for example, decrease to 10 candidates. Because only cross-carrier uplink scheduling is configured, DCI including an uplink grant includes a CIF, and DCI including a downlink grant includes no CIF.

For the foregoing scenario in which only one uplink resource is activated at one moment, the foregoing method for decreasing control channel candidates may also be used, and when control channel candidates decrease to 0, the method is the same as the search space sharing method described above.

In this scenario, namely, a scenario in which the first uplink resource and the second uplink resource may be simultaneously activated, a quantity of control channel candidates used for the first uplink resource may also decrease to 0, and in this case, the search space sharing method is used for implementation.

Figure 14:
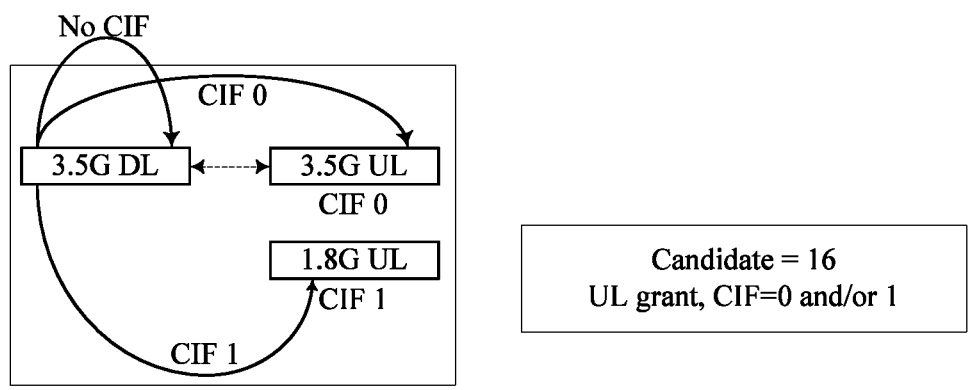
FIG. 14 is yet another schematic diagram of scheduling and a search space according to an embodiment of this application.

FIG. 14 is yet another schematic diagram of scheduling and a search space according to an embodiment of this application. As shown in FIG. 14, a solid line represents an activated uplink resource, a solid-line arrow represents scheduling, and a dashed-line arrow represents that resources on both sides of the arrow belong to one carrier resource. In the figure, 1.8 GHz uplink scheduling and 3.5 GHz uplink scheduling share a search space, similar to the description in FIG. 6. A difference is that grant information carried by a control channel on a 3.5 GHz downlink resource may include both grant information of a 1.8 GHz uplink resource and grant information of a 3.5 GHz uplink resource. Because only cross-carrier uplink scheduling is configured, DCI including an uplink grant includes a CIF, and DCI including a downlink grant includes no CIF.

Figure 15:
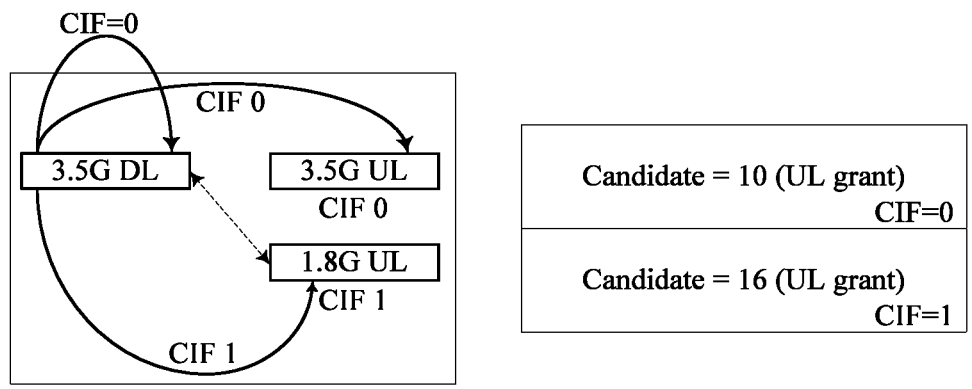
FIG. 15 is still yet another schematic diagram of scheduling and a search space according to an embodiment of this application.

FIG. 15 is still yet another schematic diagram of scheduling and a search space according to an embodiment of this application. As shown in FIG. 15, a solid line represents an activated uplink resource, a solid-line arrow represents scheduling, and a dashed-line arrow represents that resources on both sides of the arrow belong to one carrier resource. A difference between this figure and FIG. 13 is that a 3.5 GHz downlink resource and a 1.8 GHz uplink resource belong to one carrier resource, for the 3.5 GHz downlink resource, a 3.5 GHz uplink resource is scheduled through cross-carrier scheduling, and in this case, a quantity of control channel candidates for scheduling the 3.5 GHz uplink resource is 10. As shown in FIG. 15, because a base station does not re-configure index information of the 3.5 GHz uplink resource and index information of the 1.8 GHz uplink resource, when for a control channel of the 3.5 GHz downlink resource, the 1.8 GHz uplink resource is scheduled through self-carrier scheduling, CIF=1 in DCI including an uplink grant, and when for a control channel of the 3.5 GHz downlink resource, the 3.5 GHz uplink resource is scheduled through cross-carrier scheduling, CIF=0 in DCI including an uplink grant. After the base station re-configures an index of the 3.5 GHz uplink resource to 1 and an index of the 1.8 GHz uplink resource to 0, when for the control channel of the 3.5 GHz downlink resource, the 1.8 GHz uplink resource is scheduled through self-carrier scheduling, CIF=1 in the DCI including the uplink grant, and when for the control channel of the 3.5 GHz downlink resource, the 3.5 GHz uplink resource is scheduled through cross-carrier scheduling, CIF=0 in the DCI including the uplink grant.

A specific uplink resource grant process is similar to that in the foregoing embodiment. For example, the terminal completes RRC connection establishment on the 3.5 GHz downlink resource and the 3.5 GHz uplink resource. After receiving capability information reported by the terminal, the network device configures, for the terminal based on the capability information, a first uplink resource and a second uplink resource, which are the 1.8 GHz uplink resource and the 3.5 GHz uplink resource, respectively. An index of the 3.5 GHz uplink resource is "0", and an index of the 1.8 GHz uplink resource is "1". The network device sends information about a configured uplink resource to the terminal, so that the terminal learns of the configured uplink resource. Then, the network device may send grant information to the terminal at the request of the terminal or actively, where a control channel search space that carries the grant information may be the shared search space in the embodiment shown in FIG. 4 or the search space in which control channel candidates used for scheduling of the 1.8 GHz or 3.5 GHz uplink resource decrease. For details, refer to the foregoing embodiment. No more details are described herein.

It can be learned that when the terminal has only one uplink resource activated at one moment, the grant information includes grant information of the activated uplink resource, to be specific, grant information of the first uplink resource or the second uplink resource. When the terminal has a plurality of uplink resources activated at one moment, in other words, the first uplink resource and the second uplink resource may be simultaneously activated, the grant information includes grant information of the activated uplink resources, to be specific, grant information of the first uplink resource and/or the second uplink resource. In addition, the grant information may further include grant information of a downlink resource, to help the terminal perform downlink transmission.

In the foregoing embodiment, when a plurality of uplink resources may be simultaneously activated, for example, when the first uplink resource and the second uplink resource may be simultaneously activated, the network device may determine, based on a load, whether to use a search space sharing technology. In other words, the network device may determine, based on the load, whether to schedule the first uplink resource and the second uplink resource in a same control channel candidate set, that is, whether to use the same control channel candidate set to carry the grant information of the first uplink resource and the second uplink resource. The load may be represented by utilization of a downlink resource block (RB) or RB resource utilization of each downlink channel, or may be represented by a quantity of terminals. When the load is less than or equal to a first preset value, the first uplink resource and the second uplink resource are scheduled in a same control channel candidate set, and when the load is greater than or equal to a second preset value, the first uplink resource and the second uplink resource are scheduled in different control channel candidate sets, where there is an offset between the control channel candidate sets and a quantity of control channel candidates in a control channel candidate set used for scheduling the first uplink resource is less than a quantity of control channel candidates in a control channel candidate set used for scheduling the second uplink resource.

Figure 16A:
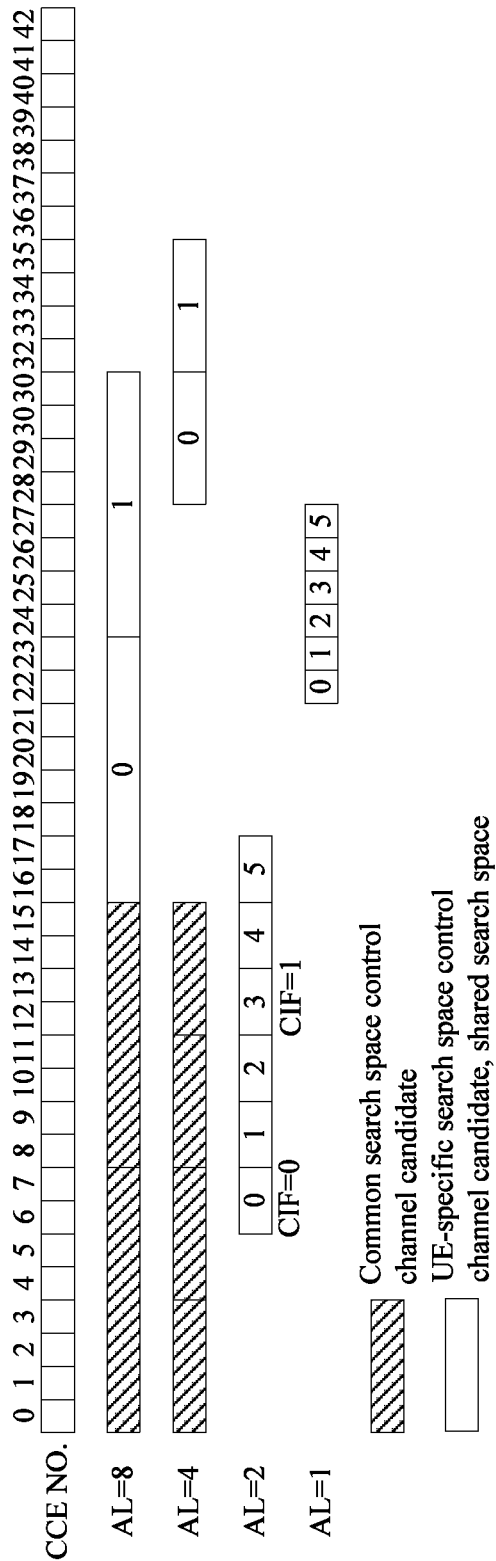
FIG. 16(a) is a schematic diagram of distribution of a control channel in a search space according to an embodiment of this application.

When the network device finds that a load of a serving cell (for example, a serving cell corresponding to the 3.5 GHz downlink resource) is relatively small, for example, a quantity of served terminals is relatively small or downlink resource utilization is relatively low, CCEs in a control channel candidate that is used for 3.5 GHz downlink scheduling and that corresponds to each aggregation level are less probable to be used by other terminals, and therefore in a case of a relatively low collision probability, the network device may transmit a control channel used for 1.8 GHz uplink resource scheduling on an unused control channel candidate used for 3.5 GHz scheduling. FIG. 16(a) is a schematic diagram of distribution of a control channel in a search space according to an embodiment of this application. Six control channel candidates 0 to 5 that are used for 3.5 GHz scheduling and whose aggregation level is 2 are not used by other terminals. In this case, a PDCCH used to carry 3.5 GHz uplink grant information may be transmitted on the control channel candidate 0, and a PDCCH used to carry 1.8 GHz uplink grant information may be transmitted on one of the remaining control channel candidates, for example, transmitted on the control channel candidate 3.

Figure 16B:
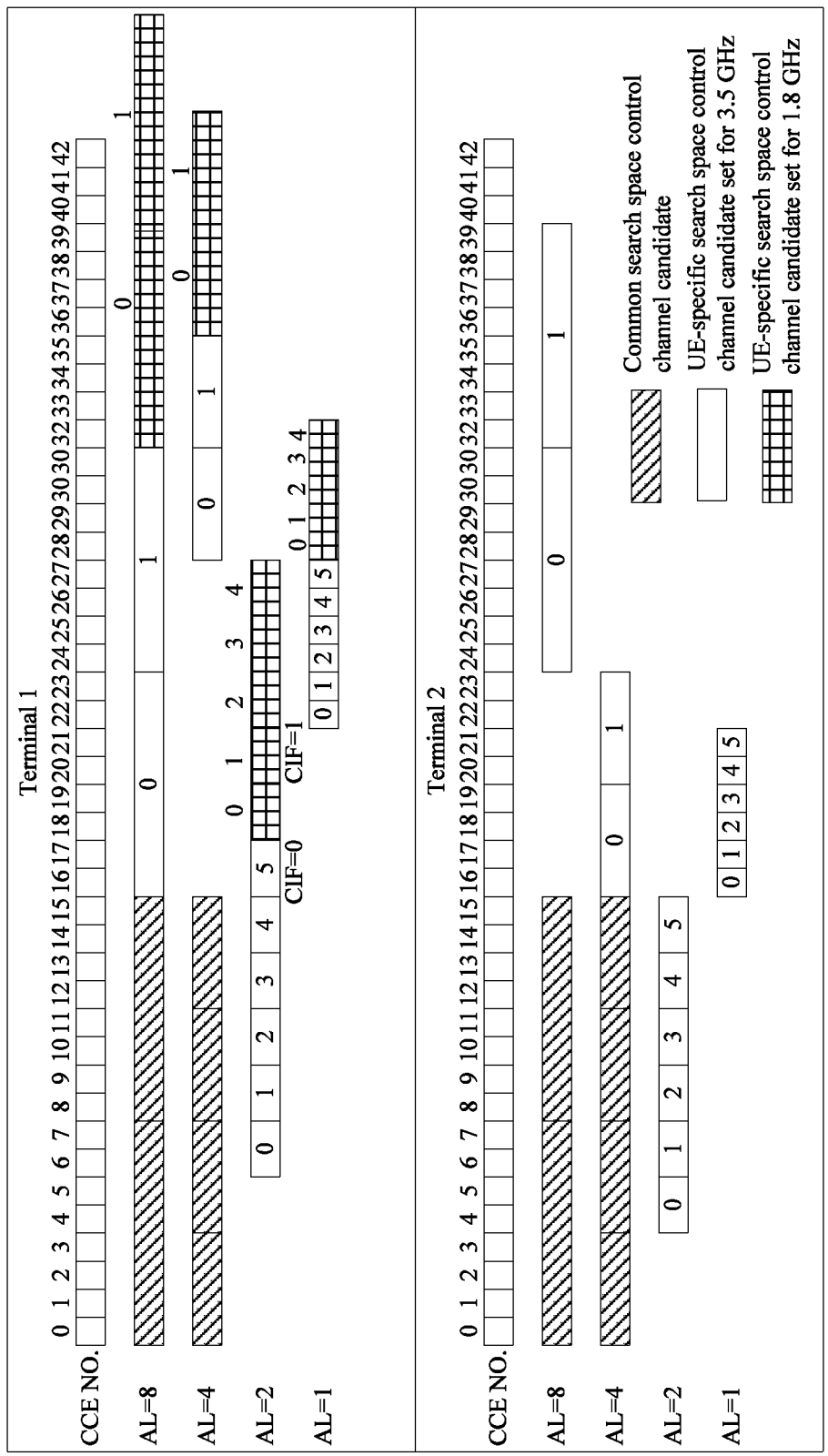
FIG. 16(b) is another schematic diagram of distribution of a control channel in a search space according to an embodiment of this application.

When the network device finds that a load of a serving cell (for example, a serving cell corresponding to the 3.5 GHz downlink resource) is relatively large, for example, a quantity of served terminals is relatively large or downlink resource utilization is relatively high, CCEs in a control channel candidate that is used for 3.5 GHz downlink scheduling and that corresponds to each aggregation level are highly probable to be used by other terminals, and therefore in a case of a relatively high collision probability, the network device may transmit a control channel used for 1.8 GHz uplink resource scheduling on a control channel candidate having an offset. FIG. 16(b) is another schematic diagram of distribution of a control channel in a search space according to an embodiment of this application. Six control channel candidates 0 to 5 that are used for 3.5 GHz scheduling and whose aggregation level is 2 may be used by other terminals. In this case, a PDCCH used to carry 3.5 GHz uplink grant information may be transmitted on the control channel candidate 5, and a PDCCH used to carry 1.8 GHz uplink grant information may be transmitted on one control channel candidate in a control channel candidate set used for 1.8 GHz, for example, transmitted on a control channel candidate 1 in the control channel candidate set used for 1.8 GHz. A quantity of control channel candidates in the control channel candidate set used for 1.8 GHz is less than a quantity of control channel candidates in the control channel candidate set used for 3.5 GHz, and there is a specific offset between the two control channel candidate sets.

The foregoing methods may be implemented in corresponding apparatuses, and the following provides description with reference to accompanying drawings.

Figure 17:
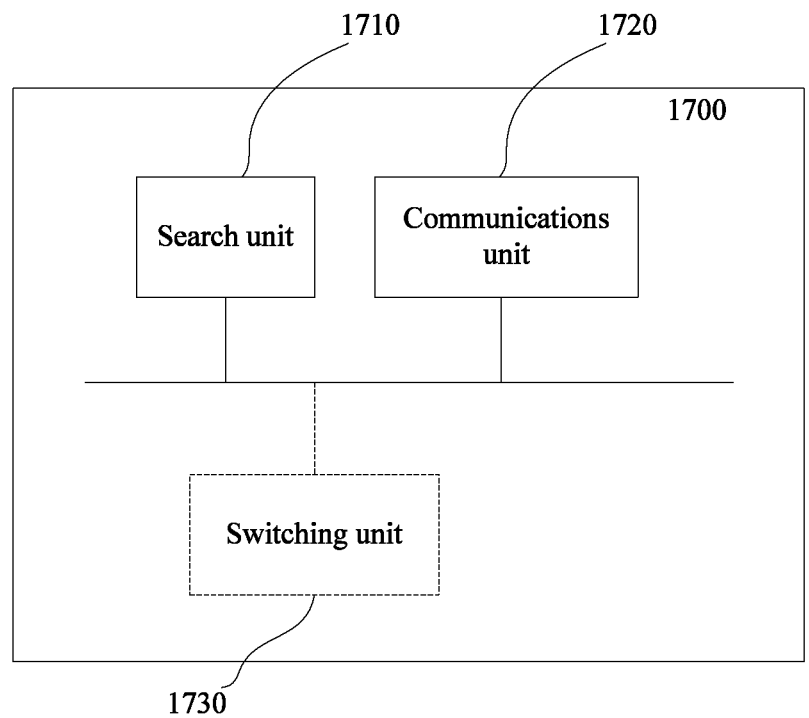
FIG. 17 is a schematic diagram of an uplink resource grant apparatus according to an embodiment of this application.

FIG. 17 is a schematic diagram of an uplink resource grant apparatus according to an embodiment of this application. The apparatus 1700 is applied to a terminal. As shown in FIG. 17, the apparatus 1700 includes units or means that perform each step performed by the terminal in any one of the foregoing method embodiments, and detailed description about these steps is applicable to this apparatus embodiment. For example, the apparatus 1700 includes a search unit 1710 and a communications unit 1720. The communications unit 1720 is configured to control communication between the terminal and a network device. The communications unit 1720 may receive and send information through an interface (for example, an air interface) between the terminal and the network device. The interface herein is a logical concept, and during implementation, a corresponding logical unit needs to be set to meet protocol requirements of the corresponding interface.

The search unit 1710 is configured to search a search space for a downlink control channel to obtain grant information that is sent by the network device to the terminal, where the grant information includes at least one of grant information of a first uplink resource, grant information of a second uplink resource, and grant information of a downlink resource used to carry the downlink control channel. The search space includes a first control channel candidate set when the downlink control channel carries the grant information of the first uplink resource, and the search space includes a second control channel candidate set when the downlink control channel carries the grant information of the second uplink resource and/or the grant information of the downlink resource, or the search space includes a first control channel candidate set when the downlink control channel carries the grant information of the second uplink resource, and the search space includes a second control channel candidate set when the downlink control channel carries the grant information of the first uplink resource and/or the grant information of the downlink resource. The first control channel candidate set is the same as the second control channel candidate set, or the first control channel candidate set has an offset with respect to the second control channel candidate set, and a quantity of control channel candidates in the first control channel candidate set is less than a quantity of control channel candidates in the second control channel candidate set.

Description about the search space, the first uplink resource, the second uplink resource, information about the first uplink resource, and information about the second uplink resource is the same as that in the foregoing embodiments. Details are not described herein again.

Optionally, the terminal may further include a switching unit 1730, and when the communications unit 1720 receives a switching indication, the switching unit 1730 is configured to switch an activated uplink resource from the first uplink resource to the second uplink resource or from the second uplink resource to the first uplink resource.

Description about the switching indication is the same as that in the foregoing embodiments. Details are not described herein again.

It should be understood that division of the units of the foregoing apparatus is merely division of logical functions. During actual implementation, all or some of the units may be integrated into a physical entity, or may be physically separated. In addition, all the units may be implemented in a form of software invoked by a processing element, or may be implemented in a form of hardware, or some units may be implemented in a form of software invoked by a processing element, and some units are implemented in a form of hardware. For example, the search unit 1710 may be a separately disposed processing element, or may be integrated into a chip of the terminal. Alternatively, the search unit 1710 may be stored in a memory as a program and invoked by a processing element of the terminal to perform a function of the unit. Implementation of other units is similar to that of the search unit 1710. In addition, all or some of the units may be integrated together or may be implemented separately. The processing element herein may be an integrated circuit with a signal processing capability. In an implementation process, steps of the foregoing method or the foregoing units may be implemented by using an integrated logic circuit of hardware in the processor element, or by using an instruction in a form of software. In addition, the communications unit is a unit controlling communication, and may receive information sent by the network device or send information to the network device through a transceiver apparatus of the terminal such as an antenna or a radio frequency apparatus.

For example, the foregoing units may be configured as one or more integrated circuits for implementing the foregoing method, for example, one or more application-specific integrated circuits (ASIC), or one or more microprocessors (DSP), or one or more field programmable gate arrays (FPGA). For another example, when one of the foregoing units is implemented in a form of a processing element invoking a program, the processing element may be a general-purpose processor, for example, a central processing unit (CPU) or another processor that can invoke the program. For yet another example, the units may be integrated and implemented in a form of a system-on-a-chip (SOC).

Figure 18:
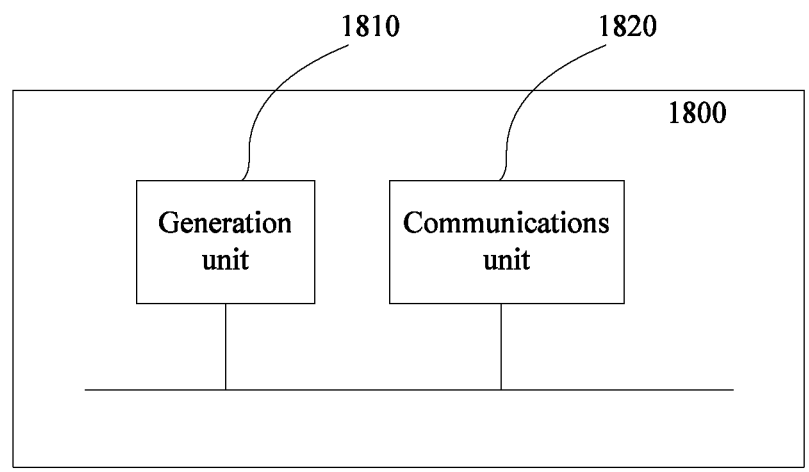
FIG. 18 is a schematic diagram of a frequency domain resource processing apparatus according to an embodiment of this application.

FIG. 18 is a schematic diagram of a frequency domain resource processing apparatus according to an embodiment of this application. The apparatus 1800 is applied to a network device. As shown in FIG. 18, the apparatus 1800 includes units or means that perform each step performed by the network device in any one of the foregoing method embodiments, and detailed description about these steps is applicable to this apparatus embodiment. The apparatus includes a generation unit 1810 and a communications unit 1820. The communications unit 1820 is configured to control communication with the network device, and may receive and send messages through an interface (for example, an air interface) between the network device and a terminal. The interface herein is a logical concept, and during implementation, a corresponding logical unit needs to be set to meet protocol requirements of the corresponding interface.

The generation unit 1810 is configured to generate configuration information and grant information carried on a downlink control channel. Content about the configuration information and a configuration method of a configured first uplink resource and second uplink resource are the same as those in the foregoing embodiments. Details are not described herein again. The communications unit 1820 controls sending of the configuration information and the grant information that are generated by the generation unit 1810. For example, the communications unit 1820 is configured to: send the configuration information to the terminal, and send a downlink control channel on a downlink control channel search space, where the downlink control channel includes the grant information for the terminal.

Description about the search space, the first uplink resource, the second uplink resource, information about the first uplink resource, and information about the second uplink resource is the same as that in the foregoing embodiments. Details are not described herein again.

In addition, the communications unit 1820 is further configured to control sending of information that is sent to the terminal by another network device in the foregoing embodiments. For example, the communications unit 1820 controls sending of a switching indication and sending of a configuration parameter. Description about the switching indication and the configuration parameter is the same as that in the foregoing embodiments. Details are not described herein again.

It should be understood that division of the units of the foregoing apparatus is merely division of logical functions. During actual implementation, all or some of the units may be integrated into a physical entity, or may be physically separated. In addition, all the units may be implemented in a form of software invoked by a processing element, or may be implemented in a form of hardware, or some units may be implemented in a form of software invoked by a processing element, and some units are implemented in a form of hardware. For example, the generation unit 1810 may be a separately disposed processing element, or may be integrated into a chip of the network device. Alternatively, the generation unit 1810 may be stored in a memory of the network device as a program and invoked by a processing element of the network device to perform a function of the unit. Implementation of other units is similar to that of the generation unit 1810. In addition, all or some of the units may be integrated together or may be implemented separately. The processing element herein may be an integrated circuit with a signal processing capability. In an implementation process, steps of the foregoing method or the foregoing units may be implemented by using an integrated logic circuit of hardware in the processor element, or by using an instruction in a form of software.

For example, the foregoing units may be configured as one or more integrated circuits for implementing the foregoing method, for example, one or more application-specific integrated circuits (ASIC), or one or more microprocessors (DSP), or one or more field programmable gate arrays (FPGA). For another example, when one of the foregoing units is implemented in a form of a processing element invoking a program, the processing element may be a general-purpose processor, for example, a central processing unit (CPU) or another processor that can invoke the program. For yet another example, the units may be integrated and implemented in a form of a system-on-a-chip (SOC).

Figure 19:
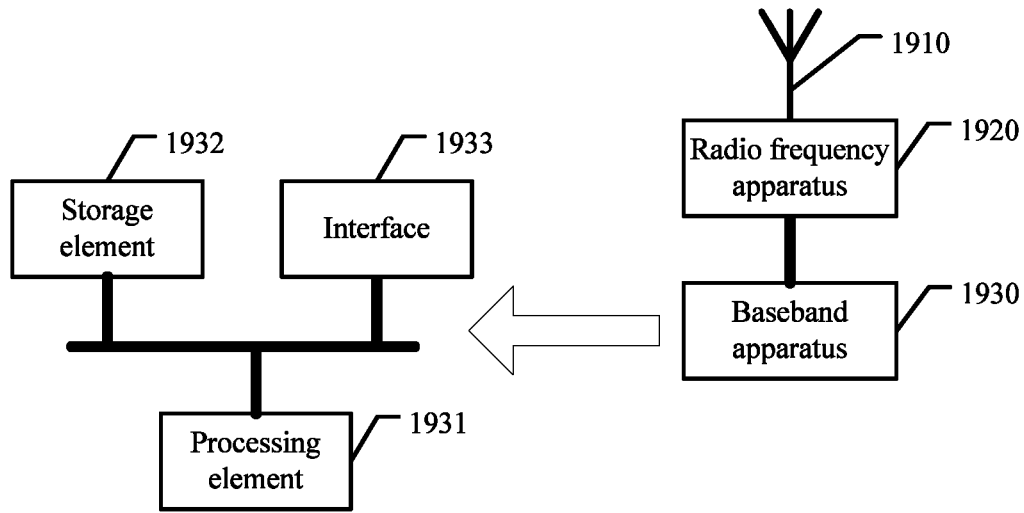
FIG. 19 is a schematic structural diagram of a network device according to an embodiment of this application.

FIG. 19 is a schematic structural diagram of a network device according to an embodiment of this application. The network device may be the network device in the foregoing embodiment and configured to implement operations of the network device in the foregoing embodiment. As shown in FIG. 19, the network device includes an antenna 1910, a radio frequency apparatus 1920, and a baseband apparatus 1930. The antenna 1910 is connected to the radio frequency apparatus 1920. In an uplink direction, the radio frequency apparatus 1920 receives, through the antenna 1910, information sent by a terminal, and sends the information sent by the terminal, to the baseband apparatus 1930 for processing. In a downlink direction, the baseband apparatus 1930 processes information for the terminal and sends the information to the radio frequency apparatus 1920, and the radio frequency apparatus 1920 processes the information for the terminal, and then sends the information to the terminal through the antenna 1910.

The baseband apparatus 1930 may include a baseband board. The network device usually may include a plurality of baseband boards, and a plurality of processing elements may be integrated on the baseband boards to implement desired functions. For example, the foregoing frequency domain resource processing apparatus may be located in the baseband apparatus 1930. In an implementation, the units shown in FIG. 18 are implemented in a form of a processing element invoking a program, for example, the baseband apparatus 1930 includes a processing element 1931 and a storage element 1932, and the processing element 1931 invokes a program stored in the storage element 1932 to perform the method performed by the network device in the foregoing method embodiments. In addition, the baseband apparatus 1930 may further include an interface 1933, configured to exchange information with the radio frequency apparatus 1920. The interface is, for example, a common public radio interface (CPRI).

In another implementation, the units shown in FIG. 18 may be configured as one or more processing elements for implementing the foregoing method performed by the network device, and these processing elements are disposed in the baseband apparatus 1930. The processing element herein may be an integrated circuit, for example, one or more ASICs, or one or more DSPs, or one or more FPGAs. These integrated circuits may be integrated together to form a chip.

For example, the units shown in FIG. 18 may be integrated and implemented in a form of a system-on-a-chip (SOC). For example, the baseband apparatus 1930 includes an SOC chip configured to implement the foregoing method. The chip may be integrated with the processing element 1931 and the storage element 1932, and the processing element 1931 invokes the program stored in the storage element 1932 to implement the foregoing method performed by the network device or functions of the units shown in FIG. 18. Alternatively, the chip may be integrated with at least one integrated circuit, to implement the foregoing method performed by the network device or functions of the units shown in FIG. 18. Alternatively, the foregoing implementations may be combined, where functions of some units are implemented by the processing element by invoking a program, and functions of some units are implemented by an integrated circuit.

Regardless of which manner is used, the foregoing frequency domain resource processing apparatus used for the network device includes at least one processing element and storage element, where the at least one processing element is configured to perform the method performed by the network device provided in the foregoing method embodiments. The processing element may perform, in a first manner, to be specific, by executing the program stored in the storage element, some or all of the steps performed by the network device in the foregoing method embodiments, or perform, in a second manner, to be specific, by combining an integrated logic circuit of hardware in the processor element with instructions, some or all of the steps performed by the network device in the foregoing method embodiments, or certainly, may perform, by combining the first manner and the second manner, some or all of the steps performed by the network device in the foregoing method embodiments.

Similar to the foregoing description, the processing element herein may be a general-purpose processor such as a central processing unit (CPU), or may be configured as one or more integrated circuits for implementing the foregoing method, for example, one or more application-specific integrated circuits (ASIC), or one or more microprocessors (DSP), or one or more field programmable gate arrays (FPGA).

The storage element may be a memory, or may be a general term of a plurality of storage elements.

Figure 20:
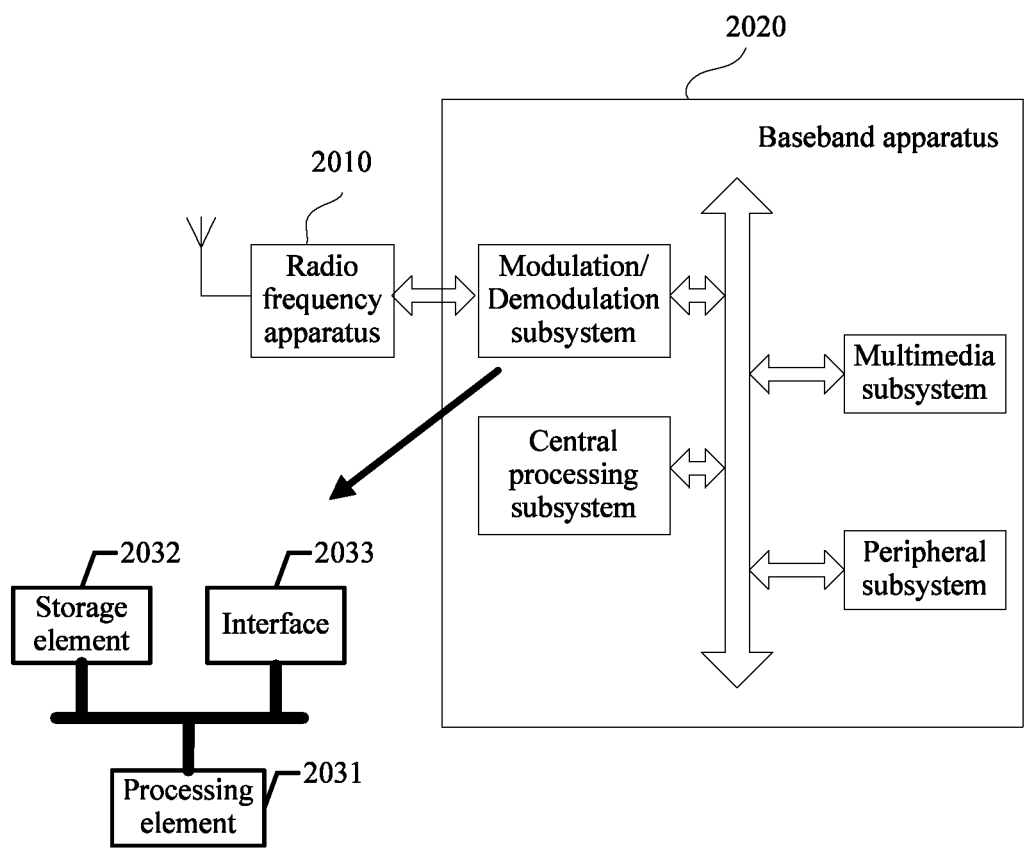
FIG. 20 is a schematic structural diagram of a terminal according to an embodiment of this application.

FIG. 20 is a schematic structural diagram of a terminal according to an embodiment of this application. The terminal may be the terminal in the foregoing embodiment, configured to implement operations of the terminal in the foregoing embodiment. As shown in FIG. 20, the terminal includes an antenna, a radio frequency apparatus 2010, and a baseband apparatus 2020. The antenna is connected to the radio frequency apparatus 2010. In a downlink direction, the radio frequency apparatus 2010 receives, through the antenna, information sent by a network device, and sends the information sent by the network device, to the baseband apparatus 2020 for processing. In an uplink direction, the baseband apparatus 2020 processes information of the terminal and sends the information to the radio frequency apparatus 2010, and the radio frequency apparatus 2010 processes the information of the terminal, and then sends the information to the network device through the antenna.

The baseband apparatus may include a modulation/demodulation subsystem, configured to implement data processing at each communication protocol layer. The baseband apparatus may further include a central processing subsystem, configured to implement processing of an operating system and an application layer of the terminal. In addition, the baseband apparatus may further include other subsystems, for example, a multimedia subsystem and a peripheral subsystem, where the multimedia subsystem is configured to implement control on a terminal camera, screen display, or the like, and the peripheral subsystem is configured to implement connections to other devices. The modulation/demodulation subsystem may be a separately disposed chip, and optionally, the foregoing frequency domain resource processing apparatus may be implemented on the modulation/demodulation subsystem.

In an implementation, the units shown in FIG. 17 are implemented in a form of a processing element invoking a program. For example, a subsystem of the baseband apparatus 2020 such as the modulation/demodulation subsystem includes a processing element 2031 and a storage element 2032, and the processing element 2031 invokes a program stored in the storage element 2032 to perform the method performed by the terminal in the foregoing method embodiments. In addition, the baseband apparatus 2020 may further include an interface 2033, configured to exchange information with the radio frequency apparatus 2010.

In another implementation, the units shown in FIG. 17 may be configured as one or more processing elements for implementing the foregoing method performed by the terminal, and these processing elements are disposed in a subsystem of the baseband apparatus 2020 such as the modulation/demodulation subsystem. The processing element herein may be an integrated circuit, for example, one or more ASICs, or one or more DSPs, or one or more FPGAs. These integrated circuits may be integrated together to form a chip.

For example, the units shown in FIG. 17 may be integrated and implemented in a form of a system-on-a-chip (SOC). For example, the baseband apparatus 2020 includes an SOC chip configured to implement the foregoing method. The chip may be integrated with the processing element 2031 and the storage element 2032, and the processing element 2031 invokes the program stored in the storage element 2032 to implement the foregoing method performed by the terminal or functions of the units shown in FIG. 17. Alternatively, the chip may be integrated with at least one integrated circuit, to implement the foregoing method performed by the terminal or functions of the units shown in FIG. 17. Alternatively, the foregoing implementations may be combined, where functions of some units are implemented by the processing element by invoking a program, and functions of some units are implemented by an integrated circuit.

Regardless of which manner is used, the foregoing frequency domain resource processing apparatus used for the terminal includes at least one processing element and storage element, where the at least one processing element is configured to perform the method performed by the terminal provided in the foregoing method embodiments. The processing element may perform, in a first manner, to be specific, by executing the program stored in the storage element, some or all of the steps performed by the terminal in the foregoing method embodiments, or perform, in a second manner, to be specific, by combining an integrated logic circuit of hardware in the processor element with instructions, some or all of the steps performed by the terminal in the foregoing method embodiments, or certainly, may perform, by combining the first manner and the second manner, some or all of the steps performed by the terminal in the foregoing method embodiments.

Similar to the foregoing description, the processing element herein may be a general-purpose processor such as a central processing unit (CPU), or may be configured as one or more integrated circuits for implementing the foregoing method, for example, one or more application-specific integrated circuits (ASIC), or one or more microprocessors (DSP), or one or more field programmable gate arrays (FPGA).

The storage element may be a memory, or may be a general term of a plurality of storage elements.

A person of ordinary skill in the art may understand that all or some of the steps of the method embodiments may be implemented by a program instructing related hardware. The program may be stored in a computer-readable storage medium. When the program is executed, the steps of the method embodiments are performed. The foregoing storage medium includes: any medium that can store program code, such as a ROM, a RAM, a magnetic disk, or an optical disc.

What is claimed is:

1. An uplink resource grant method, comprising:
   receiving, by a terminal, configuration information from a network device, wherein the configuration information comprises information about a first uplink resource and information about a second uplink resource; and
   searching, by the terminal, a search space for a downlink control channel to obtain downlink control information (DCI) from the network device, wherein the DCI comprises a carrier indicator field and grant information, wherein the carrier indicator field indicates the first uplink resource or the second uplink resource, and the grant information is grant information of the first uplink resource or the second uplink resource indicated by the carrier indicator field;
   wherein the first uplink resource, the second uplink resource, and a downlink resource for carrying the downlink control channel belong to one cell; and
   wherein for grant information of the first uplink resource and grant information of the second uplink resource, the terminal uses a same control channel candidate set to search the search space.

2. The method according to claim 1, wherein the first uplink resource is a supplementary uplink (SUL) resource.

3. The method according to claim 1, further comprising:
   obtaining, by the terminal, grant information of the downlink resource from the network device on a control channel candidate in a same control channel candidate set.

4. The method according to claim 1, wherein the receiving the configuration information comprises:
   receiving system information or a radio resource control (RRC) message from the network device, wherein the system information or the RRC message comprises the configuration information.

5. The method according to claim 1, wherein a value "1" of the carrier indicator field indicates the first uplink resource, a value "0" of the carrier indicator field indicates the second uplink resource.

6. The method according to claim 1, wherein at a same moment, one of the first uplink resource and the second uplink resource is activated.

7. An apparatus, comprising:
   at least one processor; and
   a memory coupled to the at least one processor, the at least one processor being configured to:
      receive configuration information from a network device, wherein the configuration information comprises information about a first uplink resource and information about a second uplink resource; and
      search a search space for a downlink control channel to obtain downlink control information (DCI) from the network device, wherein the DCI comprises a carrier indicator field and grant information, wherein the carrier indicator field indicates the first uplink resource or the second uplink resource, and the grant information is grant information of the first uplink resource or the second uplink resource indicated by the carrier indicator field;
   wherein the first uplink resource, the second uplink resource, and a downlink resource for carrying the downlink control channel belong to one cell; and
   wherein for grant information of the first uplink resource and grant information of the second uplink resource, the apparatus uses a same control channel candidate set to search the search space.

8. The apparatus according to claim 7, wherein the first uplink resource is a supplementary uplink (SUL) resource.

9. The apparatus according to claim 7, wherein the at least one processor is further configured to:
   obtain grant information of the downlink resource from the network device on a control channel candidate in a same control channel candidate set.

10. The apparatus according to claim 7, wherein the at least one processor is configured to:
    receive system information or a radio resource control (RRC) message from the network device, wherein the system information or the RRC message comprises the configuration information.

11. The apparatus according to claim 7, wherein a value "1" of the carrier indicator field indicates the first uplink resource, a value "0" of the carrier indicator field indicates the second uplink resource.

12. The apparatus according to claim 7, wherein at a same moment, one of the first uplink resource and the second uplink resource is activated.

13. An uplink resource grant method, comprising:
    sending, by a network device, configuration information to a terminal, wherein the configuration information comprises information about a first uplink resource and information about a second uplink resource; and
    sending, by the network device, a downlink control channel on a search space for the downlink control channel, wherein the downlink control channel carries downlink control information (DCI), and the DCI comprises a carrier indicator field and grant information for the terminal, wherein the carrier indicator field indicates the first uplink resource or the second uplink resource, and the grant information is grant information of the first uplink resource or the second uplink resource indicated by the carrier indicator field;
    wherein the first uplink resource, the second uplink resource, and a downlink resource for carrying the downlink control channel belong to one cell; and
    wherein for grant information of the first uplink resource and grant information of the second uplink resource, the network device uses a same control channel candidate set of the search space.

14. The method according to claim 13, wherein the first uplink resource is a supplementary uplink (SUL) resource.

15. The method according to claim 13, wherein a value "1" of the carrier indicator field indicates the first uplink resource, a value "0" of the carrier indicator field indicates the second uplink resource.

16. The method according to claim 13, further comprising:
sending, by the network device, grant information of the downlink resource to the terminal on a control channel candidate in a same control channel candidate set.

17. The method according to claim 13, wherein the sending the configuration information, comprises:
sending system information or a radio resource control (RRC) message to the terminal, wherein the system information or the RRC message comprises the configuration information.

18. The method according to claim 13, wherein at a same moment, one of the first uplink resource and the second uplink resource is activated.

19. An apparatus, comprising:
at least one processor; and
a memory coupled to the at least one processor, the at least one processor being configured to:
send configuration information to a terminal, wherein the configuration information comprises information about a first uplink resource and information about a second uplink resource; and
send a downlink control channel on a search space for the downlink control channel, wherein the downlink control channel carries downlink control information (DCI), and the DCI comprises a carrier indicator field and grant information for the terminal, wherein the carrier indicator field indicates the first uplink resource or the second uplink resource, and the grant information is grant information of the first uplink resource or the second uplink resource indicated by the carrier indicator field;
wherein the first uplink resource, the second uplink resource, and a downlink resource for carrying the downlink control channel belong to one cell; and
wherein for grant information of the first uplink resource and grant information of the second uplink resource, the apparatus uses a same control channel candidate set of the search space.

20. The apparatus according to claim 19, wherein the first uplink resource is a supplementary uplink (SUL) resource.

21. The apparatus according to claim 19, wherein a value "1" of the carrier indicator field indicates the first uplink resource, a value "0" of the carrier indicator field indicates the second uplink resource.

22. The apparatus according to claim 19, wherein the at least one processor is further configured to:
send grant information of the downlink resource to the terminal on a control channel candidate in a same control channel candidate set.

23. The apparatus according to claim 19, wherein the at least one processor is further configured to:
send system information or a radio resource control (RRC) message to the terminal, wherein the system information or the RRC message comprises the configuration information.

24. The apparatus according to claim 19, wherein at a same moment, one of the first uplink resource and the second uplink resource is activated.

* * * * *